US007609666B2

(12) United States Patent
Karabinis

(10) Patent No.: US 7,609,666 B2
(45) Date of Patent: Oct. 27, 2009

(54) METHODS AND SYSTEMS PROVIDING ADAPTIVE FEEDER LINKS FOR GROUND BASED BEAM FORMING AND RELATED SYSTEMS AND SATELLITES

(75) Inventor: Peter D. Karabinis, Cary, NC (US)

(73) Assignee: ATC Technologies LLC, Reston, VA (US)

( * ) Notice: Subject to any disclaimer, the term of this patent is extended or adjusted under 35 U.S.C. 154(b) by 640 days.

(21) Appl. No.: 11/375,422

(22) Filed: Mar. 14, 2006

(65) Prior Publication Data

US 2006/0211419 A1 Sep. 21, 2006

Related U.S. Application Data

(60) Provisional application No. 60/661,690, filed on Mar. 15, 2005.

(51) Int. Cl.
*H04B 7/185* (2006.01)
(52) U.S. Cl. .................. 370/316; 370/325; 370/335; 370/478; 455/12.1; 455/427
(58) Field of Classification Search .......... 370/316, 370/310, 325, 331, 335, 342, 478; 455/12.1, 455/13.3, 427, 428, 435.1; 375/130
See application file for complete search history.

(56) References Cited

U.S. PATENT DOCUMENTS

| 4,901,307 A | 2/1990 | Gilhousen et al. |
| 5,073,900 A | 12/1991 | Mallinckrodt |
| 5,303,286 A | 4/1994 | Wiedeman |

(Continued)

FOREIGN PATENT DOCUMENTS

EP 0 506 255 A2 9/1992

(Continued)

OTHER PUBLICATIONS

PCT International Search Report for PCT/US2006/009354 mailed Jun. 28, 2006.

(Continued)

*Primary Examiner*—Matthew D Anderson
*Assistant Examiner*—Shaima Q Aminzay
(74) *Attorney, Agent, or Firm*—John T. Whelan

(57) ABSTRACT

A method of operating a communications system including a satellite may include providing communications feeder links between the satellite and a plurality of satellite gateways, and providing a communications service link between the satellite and at least one radioterminal using a plurality of satellite service link antenna feed elements. During a first time period, signals of first and second service link antenna feed elements of the plurality of service link antenna feed elements may be coupled between a first one of the plurality of satellite gateways and the first and second service link antenna feed elements. During a second time period, a signal of the first service link antenna feed element may be coupled between the first satellite gateway and the first service link antenna feed element, and a signal of the second service link antenna feed element may be coupled between a second one of the plurality of satellite gateways and the second service link antenna feed element. Related communications systems and satellites are also discussed.

43 Claims, 8 Drawing Sheets

U.S. PATENT DOCUMENTS

| | | | |
|---|---|---|---|
| 5,339,330 | A | 8/1994 | Mallinckrodt |
| 5,394,561 | A | 2/1995 | Freeburg |
| 5,446,756 | A | 8/1995 | Mallinckrodt |
| 5,448,623 | A | 9/1995 | Wiedeman et al. |
| 5,511,233 | A | 4/1996 | Otten |
| 5,555,257 | A | 9/1996 | Dent |
| 5,584,046 | A | 12/1996 | Martinez et al. |
| 5,612,703 | A | 3/1997 | Mallinckrodt |
| 5,619,525 | A | 4/1997 | Wiedeman et al. |
| 5,631,898 | A | 5/1997 | Dent |
| 5,761,605 | A | 6/1998 | Tawil et al. |
| 5,765,098 | A | 6/1998 | Bella |
| 5,812,947 | A | 9/1998 | Dent |
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,878,329 | A | 3/1999 | Mallinckrodt |
| 5,884,142 | A | 3/1999 | Wiedeman et al. |
| 5,903,549 | A * | 5/1999 | von der Embse et al. .... 370/310 |
| 5,907,541 | A | 5/1999 | Fairholm et al. |
| 5,926,758 | A | 7/1999 | Grybos et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,072 | B1 | 5/2001 | Lo et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,317,420 | B1 * | 11/2001 | Schiff ......................... 370/325 |
| 6,324,405 | B1 | 11/2001 | Young et al. |
| 6,339,707 | B1 | 1/2002 | Wainfan et al. |
| 6,418,147 | B1 | 7/2002 | Wiedeman |
| 6,449,461 | B1 | 9/2002 | Otten |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,999,720 | B2 | 2/2006 | Karabinis |
| 7,006,789 | B2 | 2/2006 | Karabinis et al. |
| 2002/0041575 | A1 | 4/2002 | Karabinis et al. |
| 2002/0090942 | A1 | 7/2002 | Karabinis et al. |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0022625 | A1 | 1/2003 | Otten et al. |
| 2003/0054760 | A1 | 3/2003 | Karabinis |
| 2003/0054761 | A1 | 3/2003 | Karabinis |
| 2003/0054762 | A1 | 3/2003 | Karabinis |
| 2003/0054814 | A1 | 3/2003 | Karabinis et al. |
| 2003/0054815 | A1 | 3/2003 | Karabinis |
| 2003/0068978 | A1 | 4/2003 | Karabinis et al. |
| 2003/0073436 | A1 | 4/2003 | Karabinis et al. |
| 2003/0149986 | A1 | 8/2003 | Mayfield et al. |
| 2003/0153267 | A1 | 8/2003 | Karabinis |
| 2003/0153308 | A1 | 8/2003 | Karabinis |
| 2003/0224785 | A1 | 12/2003 | Karabinis |
| 2004/0066347 | A1 | 4/2004 | Schiff |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0240525 | A1 | 12/2004 | Karabinis et al. |
| 2004/0259497 | A1 * | 12/2004 | Dent ......................... 455/13.3 |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 | 4/2005 | Singh et al. |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040613 | A1 | 2/2006 | Karabinis et al. |
| 2006/0040657 | A1 | 2/2006 | Karabinis et al. |
| 2006/0040659 | A1 | 2/2006 | Karabinis |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |

| | | |
|---|---|---|
| WO | WO 01/54314 A1 | 7/2001 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

* cited by examiner

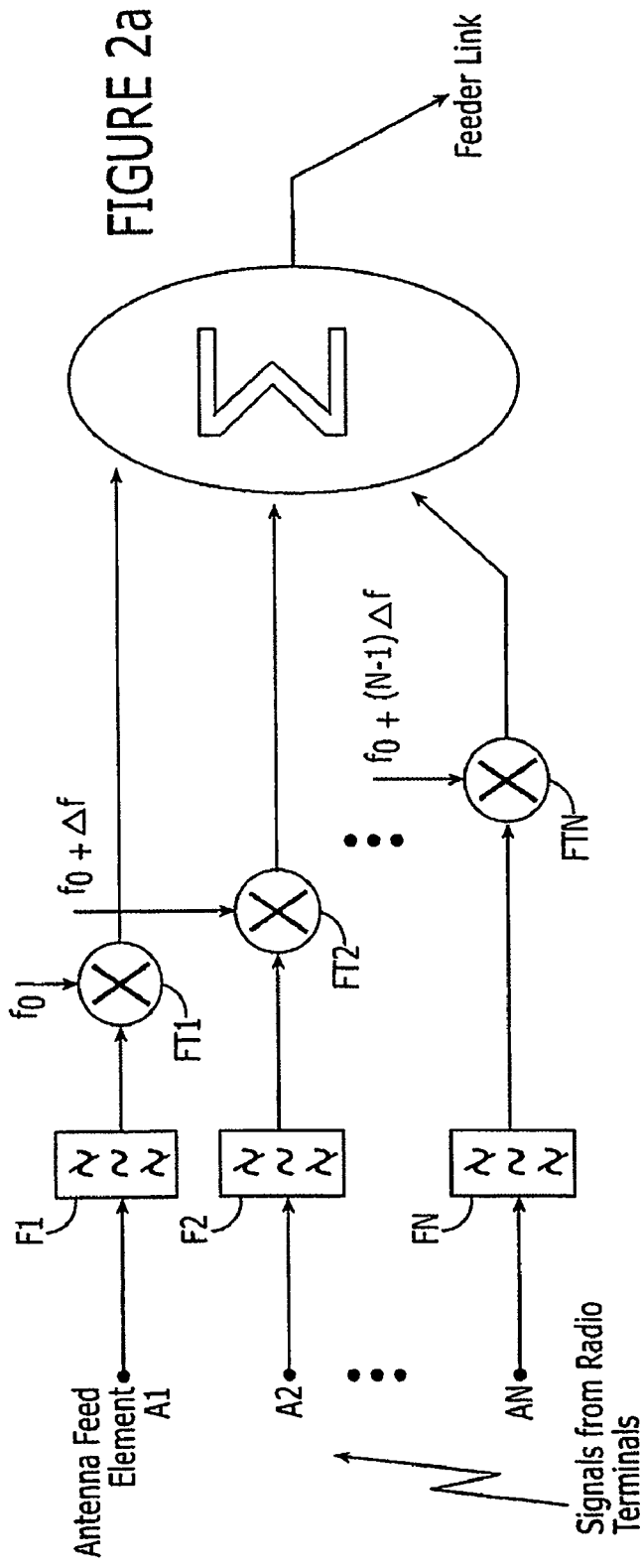
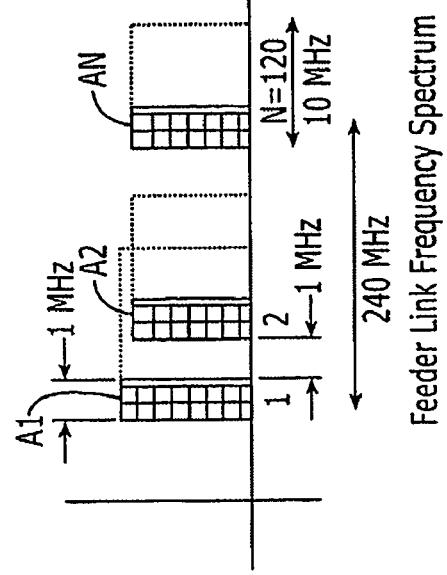

Return Service Link Spectrum

Return Feeder Link Spectrum

Return Service Link Spectrum

Return Feeder Link Spectrum

METHODS AND SYSTEMS PROVIDING ADAPTIVE FEEDER LINKS FOR GROUND BASED BEAM FORMING AND RELATED SYSTEMS AND SATELLITES

RELATED APPLICATIONS

The present application claims the benefit of priority to U.S. Provisional Application No. 60/661,690 filed Mar. 15, 2005, the disclosure of which is hereby incorporated herein in its entirety by reference.

FIELD OF THE INVENTION

This invention relates to communications systems and methods, and more particularly to satellite communications systems and methods.

BACKGROUND OF THE INVENTION

Satellite communications systems and methods are widely used for wireless communications. Satellite communications systems and methods generally employ at least one space-based component, such as one or more satellites, that is/are configured to wirelessly communicate with a plurality of satellite radioterminals.

A satellite radioterminal communications system or method may utilize a single satellite antenna pattern (beam or cell, also referred to as a global beam) covering an entire service region (service footprint) of the system. Alternatively, or in combination with the above, in cellular satellite radioterminal communications systems and methods, multiple antenna patterns (also referred to as regional spot beams, spot beams or cells) are provided, each of which can serve a substantially distinct service region, to collectively serve an overall satellite service region (also referred to as an overall satellite service footprint). Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communication signals being communicated from the satellite to the radioterminal over a downlink or forward link, and from the radioterminal to the satellite over an uplink or return link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space using any frequency or frequencies. A radioterminal also may be referred to, herein as a "radiotelephone," "terminal", or "wireless user device". Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

A terrestrial network can enhance cellular satellite radioterminal system availability, efficiency and/or economic viability by terrestrially using and/or reusing at least some of a frequency band that is allocated to and/or used by a cellular satellite radioterminal system or systems. In particular, it is known that it may be difficult for a cellular satellite radioterminal system to reliably serve densely populated areas, because a satellite signal may be blocked by high-rise structures and/or may not penetrate into buildings. As a result, a satellite spectrum may be underutilized or unutilized in such areas. The terrestrial reuse of at least some of the cellular satellite system frequencies can reduce or eliminate this potential problem.

The capacity of a hybrid system, comprising terrestrial and satellite-based communications connectivity and configured to terrestrially use and/or reuse at least some frequencies of a satellite-band, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

One example of terrestrial reuse of satellite band frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal(s) received from a satellite/radioterminal(s) thereby increasing the effective downlink/uplink margin in the vicinity of the satellite telecommunications repeaters and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radioterminals for a satellite radioterminal system or method having a terrestrial communications capability by terrestrially using/reusing at least some of the satellite frequency band and using substantially the same air interface for both terrestrial and satellite communications may be more cost effective and/or aesthetically appealing than other alternatives. Conventional dual band/dual mode radioterminal alternatives, such as the well known Thuraya, Iridium and/or Globalstar dual mode satellite/terrestrial radioterminals, duplicate some components (as a result of the different frequency bands and/or air interface protocols that are used between satellite and terrestrial communications), which can lead to increased cost, size and/or weight of the radioterminal. See U.S. Pat. No. 6,052,560 to the present inventor Karabinis, entitled Satellite System Utilizing a Plurality of Air Interface Standards and Method Employing Same.

U.S. Pat. No. 6,684,057, to present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial use/reuse of satellite frequencies are also described in Published U.S. Patent Application Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radioterminal communications systems and methods may employ satellites that use multiple bands for communications with radioterminals. For example, U.S. Patent Application Publication No. US 2003/0054762 to Karabinis, cited above, describes satellite radioterminal systems and communications methods that include a space-based component that is configured to communicate with radioterminals in a satellite footprint that is divided into satellite cells. The space-based component is configured to communicate with a first radioterminal in a first satellite cell over a first frequency band and/or a first air interface, and to communicate with a second radioterminal in the first or a second satellite cell over a second frequency band and/or a second air interface. An ancillary terrestrial network also is provided that is configured to communicate terrestrially with the first radioterminal over substantially the first frequency band and/or substantially the first air interface, and to communicate terrestrially with the second radioterminal over substantially the second frequency band and/or substantially the second air interface. See the Abstract of U.S. Patent Application Publication No. US 2003/0054762.

SUMMARY

According to embodiments of the present invention, a method of operating a communications system including a satellite may be provided. More particularly, the method may include providing communications service links between the satellite and radioterminals using a plurality of satellite service link antenna feed elements. During a first time period, signals of first and second service link antenna feed elements of the plurality of service link antenna feed elements may be coupled between a first satellite gateway and the first and second service link antenna feed elements. During a second time period, a signal of the first service link antenna feed element may be coupled between the first satellite gateway and the first service link antenna feed element, and a signal of the second service link antenna feed element may be coupled between a second satellite gateway and the second service link antenna feed element. Moreover, at least some feed elements of the plurality of satellite service link antenna feed elements may be configured to receive information from radioterminals over at least two different polarization orientations.

According to some other embodiments of the present invention, a method of operating a communications system including a satellite having a plurality of satellite service link antenna feed elements may be provided. During a first time period, a first feeder link may be provided between a first gateway and the satellite and signals for first and second feed elements of the plurality of satellite service link antenna feed elements may be communicated between the first gateway and the satellite over the first feeder link. During a second time period, the first feeder link may be provided between the first gateway and the satellite, a second feeder link may be provided between a second gateway and the satellite, signals for the first feed element may be communicated between the first gateway and the satellite over the first feeder link, and signals for the second feed element may be communicated between the second gateway and the satellite over the second feeder link. Moreover, at least some feed elements of the plurality of satellite service link antenna feed elements may be configured to receive information from radioterminals over at least two different polarization orientations.

According to still other embodiments of the present invention, a method of operating a communications system including a satellite having a plurality of satellite service link antenna feed elements may be provided. During a first time period, a feeder link may be provided between a gateway and the satellite and signals for first and second feed elements of the plurality of satellite service link antenna feed elements may be communicated between the gateway and the satellite over the feeder link, and the signals of the first and second service link antenna feed elements may be separated by a first frequency offset in the feeder link frequency band. During a second time period, the feeder link may be provided between the gateway and the satellite and signals for first and second feed elements of the plurality of satellite service link antenna feed elements may be communicated between the gateway and the satellite over the feeder link, and the signals of the first and second service link antenna feed elements may be separated by a second frequency offset in the feeder link frequency band. In addition, the first and second frequency offsets may be different. Moreover, at least some feed elements of the plurality of satellite service link antenna feed elements may be configured to receive information from radioterminals over at least two different polarization orientations.

According to yet additional embodiments of the present invention, a satellite for a communications system may include at least one antenna having a plurality of satellite service link antenna feed elements, and the at least one antenna may provide communications service links between the satellite and radioterminals using the plurality of satellite service link antenna feed elements. In addition, a translator may be configured to couple signals of first and second service link antenna feed elements of the plurality of service link antenna feed elements between a first satellite gateway and the first and second service link antenna feed elements during a first time period. The translator may also be configured to couple a signal of the first service link antenna feed element between the first satellite gateway and the first service link antenna feed element and to couple a signal of the second service link antenna feed element between a second satellite gateway and the second service link antenna feed element during a second time period. Moreover, at least some feed elements of the plurality of satellite service link antenna feed elements may be configured to receive information from radioterminals over at least two different polarization orientations.

According to more embodiments of the present invention, a space-based communications system may include first and second gateways. The first gateway may be configured to provide a first feeder link between the first gateway and a satellite including a plurality of satellite service link antenna feed elements, and to communicate signals for first and second feed elements of the plurality of satellite service link antenna feed elements between the first gateway and the satellite over the first feeder link during a first time period. The first gateway may be further configured to communicate signals for the first feed element between the first gateway and the satellite over the first feeder link during a second time period. The second gateway may be configured to provide a second feeder link between the second gateway and the satellite, and to communicate signals for the second feed element between the second gateway and the satellite over the second feeder link during the second time period. Moreover, at least some feed elements of the plurality of satellite service link antenna feed elements may be configured to receive information from radioterminals over at least two different polarization orientations.

According to yet more embodiments of the present invention, a space-based communications system may include a gateway. The gateway may be configured to provide a feeder link with a satellite and to communicate signals for first and second feed elements of a plurality of satellite service link antenna feed elements at the satellite over the feeder link during a first time period. The signals of the first and second feed elements may be separated by a first frequency offset in a feeder link frequency band during the first time period. The gateway may be further configured to communicate signals for the first and second feed elements over the feeder link during a second time period, and the signals of the first and second feed elements may be separated by a second frequency offset in the feeder link frequency band during the second time period. In addition, the first and second frequency offsets may be different. Moreover, at least some feed elements of the plurality of satellite service link antenna feed elements may be configured to receive information from radioterminals over at least two different polarization orientations.

According to some embodiments of the present invention, methods of operating a communications system including a satellite may include providing communications feeder links between the satellite and a plurality of satellite gateways, and providing a communications service link between the satellite and at least one radioterminal using a plurality of satellite service link antenna feed elements. During a first time period, signals of first and second service link antenna feed elements of the plurality of service link antenna feed elements may be coupled between a first one of the plurality of satellite gateways and the first and second service link antenna feed elements. During a second time period, a signal of the first service link antenna feed element may be coupled between the first satellite gateway and the first service link antenna feed element, and a signal of the second service link antenna feed element may be coupled between a second one of the plurality of satellite gateways and the second service link antenna feed element.

The plurality of satellite service link antenna feed elements may be elements of a phased array antenna. Moreover, signals of the first and second service link antenna feed elements may be received over the feeder link frequency band and transmitted from the first and second service link antenna feed elements over the service link frequency band. In addition and/or in an alternative, signals of the first and second service link antenna feed elements may be received at the first and second service link antenna feed elements over the service link frequency band and transmitted over the feeder link frequency band.

During a third time period, a signal of the first service link antenna feed element may be coupled between the first satellite gateway and the first service link antenna feed element, and a signal of the second service link antenna feed element may be coupled between a third one of the plurality of satellite gateways and the second service link antenna feed element. Moreover, providing a communications service link may include providing a first service link between the satellite and a first radioterminal located in a first coverage area, and providing a second communications service link between the satellite and a second radioterminal located in a second coverage area, wherein the first and second coverage areas are geographically separated. In addition, the first and second service links may reuse a same frequency at a same time.

During the first time period, the signals of the first and second service link antenna feed elements may be translated between the service link and feeder link frequency bands such that the signals of the first and second service link antenna feed elements occupy substantially a same band of frequencies in the service link frequency band and such that the signals of the first and second service link antenna feed elements are separated by a first frequency offset in the feeder link frequency band. During a third time period, a signal of the first service link antenna feed element and a signal of the second service link antenna feed element may be translated between the service link and feeder link frequency bands such that the signals of the first and second service link antenna feed elements occupy substantially a same band of frequencies in the service link frequency band and such that the signal of the first and second service link antenna feed elements are separated by a second frequency offset in the feeder link frequency band. Moreover, the first and second frequency offsets may be different. The signals of the first and second feed elements may include components of communications with at least one radioterminal in communication with the satellite.

According to some other embodiments of the present invention, a method of operating a communications system including a satellite may include providing a communications feeder link between the satellite and at least one satellite gateway over a feeder link frequency band, and providing a communications service link between the satellite and at least one radioterminal with the communications service link being provided over a service link frequency band using a plurality of satellite service link antenna feed elements. Moreover, signals for the plurality of satellite service link antenna feed elements may be translated between the service link and feeder link frequency bands. During a first time period, a signal of a first service link antenna feed element and a signal of a second service link antenna feed element of the plurality of service link antenna feed elements may be translated between the service link and feeder link frequency bands such that the signals of the first and second service link antenna feed elements occupy substantially a same band of frequencies in the service link frequency band and such that the signals of the first and second service link antenna feed elements are separated by a first frequency offset in the feeder link frequency band. During a second time period, a signal of the first service link antenna feed element and a signal of the second service link antenna feed element of the plurality of service link antenna feed elements may be translated between the service link and feeder link frequency bands such that the signals of the first and second service link antenna feed elements occupy substantially a same band of frequencies in the service link frequency band and such that the signals of the first and second service link antenna feed elements are separated by a second frequency offset in the feeder link frequency band. Moreover, the first and second frequency offsets may be different.

The plurality of satellite service link antenna feed elements may include elements of a phased array antenna. In addition, signals of the first and second service link antenna feed elements may be received over the feeder link frequency band and transmitted from the first and second service link antenna feed elements over the service link frequency band. In addition and/or in an alternative, signals of the first and second service link antenna feed elements may be received at the first and second service link antenna feed elements over the service link frequency band and transmitted over the feeder link frequency band.

During the first time period, the signals of first and second service link antenna feed elements may be coupled between a first satellite gateway and the first and second service link antenna feed elements. In addition, during a third time period, a signal of the first service link antenna feed element may be coupled between the first satellite gateway and the first service link antenna feed element, and a signal of the second service link antenna feed element may be coupled between a second satellite gateway and the second service link antenna feed element.

Providing a communications service link may include providing a first service link between the satellite and a first radioterminal located in a first coverage area, and providing a second communications service link between the satellite and a second radioterminal located in a second coverage area. Moreover, the first and second coverage areas are geographically separated. In addition, the first and second service links may reuse a same frequency at a same time.

During a third time period, a signal of the first service link antenna feed element and a signal of the second service link antenna feed element of the plurality of service link antenna feed elements may be translated between the service link and feeder link frequency bands such that the signals of the first and second service link antenna feed elements occupy substantially a same band of frequencies in the service link frequency band and such that the signal of the first and second service link antenna feed elements are separated by a third frequency offset in the feeder link frequency band. Moreover, the first, second, and third frequency offsets may all be different. The signals of the first and second feed elements may include components of communications with at least one radioterminal in communication with the satellite.

According to some more embodiments of the present invention, methods of operating a communications system including a satellite having a plurality of satellite service link antenna feed elements may include providing a first feeder link between a first terrestrial gateway and the satellite during a first time period, and communicating signals for first and second feed elements of the plurality of satellite service link antenna feed elements between the first terrestrial gateway and the satellite over the first feeder link during the first time period. During a second time period, the first feeder link may be provided between the first terrestrial gateway and the satellite, and a second feeder link may be provided between a second terrestrial gateway and the satellite. During the second time period, signals for the first feed element may be communicated between the first terrestrial gateway and the satellite over the first feeder link, and signals for the second feed element may be communicated between the second terrestrial gateway and the satellite over the second feeder link. The plurality of satellite service link antenna feed elements may include elements of a phased array antenna.

The signals of the first and second feed elements may be received from the satellite over a feeder link frequency band. Moreover, communications for transmission from the satellite to a radioterminal may be received, and first and second weights may be applied to the communications to generate respective components of the signals of the first and second service link antenna feed elements, and the first and second weights may be different. In addition and/or in an alternative, signals of the first and second feed elements may be transmitted to the satellite over the feeder link frequency band. In addition, components of the signals of the first and second service link antenna feed elements may be combined to recreate communications received at the satellite from a radioterminal.

During a third time period, the first feeder link may be provided between the first terrestrial gateway and the satellite, and a third feeder link may be provided between a third terrestrial gateway and the satellite. During the third time period, signals for the first feed element may also be communicated between the first terrestrial gateway and the satellite over the first feeder link, and signals for the second feed element may be communicated between the third terrestrial gateway and the satellite over the third feeder link. The signals for the first and second feed elements may include components of communications with at least one radioterminal in communication with the satellite.

During the first time period, the signals of the first and second service link antenna feed elements may be communicated between the first terrestrial gateway and the satellite over the first feeder link, and the signals of the first and second service link antenna feed elements may be separated by a first frequency offset in the feeder link frequency band. During a third time period, signals of the first and second service link antenna feed elements may be communicated between the first terrestrial gateway and the satellite over the first feeder link, and the signals of the first and second service link antenna feed elements may be separated by a second frequency offset in the feeder link frequency band. Moreover, the first and second frequency offsets may be different. In addition, the signals of the first and second feed elements may include components of communications with at least one radioterminal in communication with the satellite.

According to some additional embodiments of the present invention, methods of operating a communications system including a satellite having a plurality of satellite service link antenna feed elements may include providing a feeder link between a terrestrial gateway and the satellite and communicating signals for first and second feed elements of the plurality of plurality of satellite service link antenna feed elements between the terrestrial gateway and the satellite over the feeder link during a first time period. The signals of the first and second service link antenna feed elements may be separated by a first frequency offset in the feeder link frequency band. During a second time period, the feeder link may be provided between the terrestrial gateway and the satellite and signals for first and second feed elements of the plurality of plurality of satellite service link antenna feed elements may be communicated between the terrestrial gateway and the satellite over the feeder link. Moreover, the signals of the first and second service link antenna feed elements may separated by a second frequency offset in the feeder link frequency band during the second time period, and the first and second frequency offsets may be different. Moreover, the plurality of satellite service link antenna feed elements may include elements of a phased array antenna.

Signals of the first and second service link antenna feed elements may be transmitted over the feeder link frequency band. In addition, communications for transmission from the satellite to a radioterminal may be received, and first and second weights may be applied to the communications to generate respective components of the signals of the first and second service link antenna feed elements with the first and second weights being different. In addition and/or in an alternative, signals of the first and second service link antenna feed elements may be received over the feeder link frequency band. In addition, components of the signals of the first and second service link antenna feed elements may be combined to recreate communications received at the satellite from a radioterminal.

During a third time period, a signal of the first service link antenna feed element may be communicated between the first satellite gateway and the satellite, and a signal of the second service link antenna feed element may be coupled between a second satellite gateway and the satellite. The signals for the first and second service link antenna feed elements may include components of communications for first and second radioterminals located in geographically separated coverage areas.

During a third time period, the feeder link may be provided between the terrestrial gateway and the satellite and signals for first and second feed elements of the plurality of plurality of satellite service link antenna feed elements may be communicated between the terrestrial gateway and the satellite over the feeder link. Moreover, the signals of the first and second service link antenna feed elements may be separated by a third frequency offset in the feeder link frequency band, the first and third frequency offsets may be different, and the second and third frequency offsets may be different. The signals of the first and second feed elements may include components of communications with at least one radioterminal in communication with the satellite.

According to still more embodiments of the present invention, a satellite for a communications system may include at least one antenna including a plurality of satellite service link antenna feed elements and a translator. The at least one antenna may be configured to provide communications feeder links between the satellite and a plurality of satellite gateways and to provide a communications service link between the satellite and at least one radioterminal using the plurality of satellite service link antenna feed elements. The translator may be configured to couple signals of first and second service link antenna feed elements of the plurality of service link antenna feed elements between a first one of the plurality of satellite gateways and the first and second service link antenna feed elements during a first time period. During a second time period, the translator may be configured to couple a signal of the first service link antenna feed element between the first satellite gateway and the first service link antenna feed element and to couple a signal of the second service link antenna feed element between a second one of the plurality of satellite gateways and the second service link antenna feed element during a second time period.

The plurality of satellite service link antenna feed elements may include elements of a phased array antenna. Signals of the first and second service link antenna feed elements may be received over the feeder link frequency band and may be transmitted from the first and second service link antenna feed elements over the service link frequency band. In addition and/or in an alternative, signals of the first and second service link antenna feed elements may be received at the first and second service link antenna feed elements over the service link frequency band and may be transmitted over the feeder link frequency band.

The signal translator may be further configured to couple a signal of the first service link antenna feed element between the first satellite gateway and the first service link antenna feed element during a third time period. The signal translator may also be configured to couple a signal of the second service link antenna feed element between a third one of the plurality of satellite gateways and the second service link antenna feed element during a third time period. The at least one antenna may be configured to provide a first service link between the satellite and a first radioterminal located in a first coverage area, and to provide a second communications service link between the satellite and a second radioterminal located in a second coverage area with the first and second coverage areas being geographically separated. More particularly, the first and second service links may reuse a same frequency at a same time.

During the first time period, the signals of the first and second service link antenna feed elements may translated between the service link and feeder link frequency bands such that the signals of the first and second service link antenna feed elements occupy substantially a same band of frequencies in the service link frequency band and such that the signals of the first and second service link antenna feed elements are separated by a first frequency offset in the feeder link frequency band. In addition, during a third time period, the signal translator may be further configured to translate a signal of the first service link antenna feed element and a signal of the second service link antenna feed element between the service link and feeder link frequency bands such that the signals of the first and second service link antenna feed elements occupy substantially a same band of frequencies in the service link frequency band and such that the signal of the first and second service link antenna feed elements are separated by a second frequency offset in the feeder link frequency band during a third time period with the first and second frequency offsets being different. The signals of the first and second feed elements may include components of communications with at least one radioterminal in communication with the satellite.

According to still other embodiments of the present invention, a satellite for a communications system may include at least one antenna including a plurality of satellite service link antenna feed elements and a signal translator. The at least one antenna may be configured to provide a communications feeder link between the satellite and at least one satellite gateway over a feeder link frequency band and to provide a communications service link between the satellite and at least one radioterminal with the communications service link being provided over a service link frequency band using the plurality of satellite service link antenna feed elements. The signal translator may be configured to translate a signal of a first service link antenna feed element and a signal of a second service link antenna feed element of the plurality of service link antenna feed elements between the service link and feeder link frequency bands such that the signals of the first and second service link antenna feed elements occupy substantially a same band of frequencies in the service link frequency band and such that the signals of the first and second service link antenna feed elements are separated by a first frequency offset in the feeder link frequency band during a first time period. The signal translator may be further configured to translate a signal of the first service link antenna feed element and a signal of the second service link antenna feed element of the plurality of service link antenna feed elements between the service link and feeder link frequency bands such that the signals of the first and second service link antenna feed elements occupy substantially a same band of frequencies in the service link frequency band and such that the signal of the first and second service link antenna feed elements are separated by a second frequency offset in the feeder link frequency band during a second time period with the first and second frequency offsets being different.

The plurality of satellite service link antenna feed elements may include elements of a phased array antenna. Moreover, signals of the first and second service link antenna feed elements may be received over the feeder link frequency band and may be transmitted from the first and second service link antenna feed elements over the service link frequency band. In addition and/or in an alternative, signals of the first and second service link antenna feed elements may be received at the first and second service link antenna feed elements over the service link frequency band and may be transmitted over the feeder link frequency band.

During the first time period, the frequency translator may be configured to couple signals of first and second service link antenna feed elements between a first satellite gateway and the first and second service link antenna feed elements. During a third time period the signal translator may be further configured to couple a signal of the first service link antenna feed element between the first satellite gateway and the first service link antenna feed element and to couple a signal of the second service link antenna feed element between a second satellite gateway and the second service link antenna feed element.

The at least one antenna may be further configured to provide a first service link between the satellite and a first radioterminal located in a first coverage area, and to provide a second communications service link between the satellite and a second radioterminal located in a second coverage area with the first and second coverage areas being geographically separated. Moreover, the first and second service links may reuse a same frequency at a same time.

The signal translator may be further configured during a third time period to translate a signal of the first service link antenna feed element and a signal of the second service link antenna feed element of the plurality of service link antenna feed elements between the service link and feeder link frequency bands. The signals of the first and second service link antenna feed elements may occupy substantially a same band of frequencies in the service link frequency band, and the signal of the first and second service link antenna feed elements may be separated by a third frequency offset in the feeder link frequency band with the first, second, and third frequency offsets all being different. Moreover, the signals of the first and second feed elements may include components of communications with at least one radioterminal in communication with the satellite.

According to yet more embodiments of the present invention, a communications system may include first and second terrestrial gateways. The first terrestrial gateway may be configured to provide a first feeder link between a first terrestrial gateway and a satellite including a plurality of satellite service link antenna feed elements, to communicate signals for first and second feed elements of the plurality of satellite service link antenna feed elements between the first terrestrial gateway and the satellite over the first feeder link during a first time period, and to communicate signals for the first feed element between the first terrestrial gateway and the satellite over the first feeder link during a second time period. The second terrestrial gateway may be configured to provide a second feeder link between a second terrestrial gateway and the satellite, and to communicate signals for the second feed element between the second terrestrial gateway and the satellite over the second feeder link during the second time period. Moreover, the plurality of satellite service link antenna feed elements may include elements of a phased array antenna.

The signals of the first and second feed elements may be received from the satellite over a feeder link frequency band. A beamformer may be coupled to the first and second terrestrial gateways, and the beamformer may be configured to receive communications for transmission from the satellite to a radioterminal. The beamformer may also be configured to apply first and second weights to the communications to generate respective components of the signals of the first and second service link antenna feed elements with the first and second weights being different. In addition and/or in an alternative, signals of the first and second feed elements may be transmitted to the satellite over the feeder link frequency band. Accordingly, a beamformer may be configured to combine components of the signals of the first and second service link antenna feed elements to recreate communications received at the satellite from a radioterminal.

During a third time period, the first terrestrial gateway may be configured to provide the first feeder link between the first terrestrial gateway and the satellite and to communicate signals for the first feed element between the first terrestrial gateway and the satellite over the first feeder link. In addition, a third terrestrial gateway may be configured to provide a third feeder link between a third terrestrial gateway and the satellite, and to communicate signals for the second feed element between the third terrestrial gateway and the satellite over the third feeder link.

During the first time period, the first terrestrial gateway may be further configured to communicate the signals of the first and second service link antenna feed elements between the first terrestrial gateway and the satellite over the first feeder link wherein the signals of the first and second service link antenna feed elements are separated by a first frequency offset in the feeder link frequency band. During a third time period, the first terrestrial gateway may be further configured to communicate signals of the first and second service link antenna feed elements between the first terrestrial gateway and the satellite over the first feeder link with the signals of the first and second service link antenna feed elements being separated by a second frequency offset in the feeder link frequency band with the first and second frequency offsets being different. Moreover, the signals of the first and second feed elements may include components of communications with at least one radioterminal in communication with the satellite.

According to yet more embodiments of the present invention, a communication system may include a terrestrial gateway configured to provide a feeder link with a satellite. During a first time period, the terrestrial gateway may be configured to communicate signals for first and second feed elements of a plurality of satellite service link antenna feed elements at the satellite over the feeder link, wherein the signals of the first and second service link antenna feed elements are separated by a first frequency offset in the feeder link frequency band during the first time period. During a second time period, the terrestrial gateway may be configured to provide the feeder link with the satellite and to communicate signals for the first and second feed elements over the feeder link, wherein the signals of the first and second service link antenna feed elements are separated by a second frequency offset in the feeder link frequency band during the second time period with the first and second frequency offsets being different. Moreover, the plurality of satellite service link antenna feed elements comprise elements of a phased array antenna.

Signals of the first and second service link antenna feed elements may be transmitted over the feeder link frequency band. Communications for transmission from the satellite to a radioterminal may be received, and first and second weights may be applied to the communications to generate respective components of the signals of the first and second service link antenna feed elements with the first and second weights being different. In addition and/or in an alternative, signals of the first and second service link antenna feed elements may be received over the feeder link frequency band. Accordingly, components of the signals of the first and second service link antenna feed elements may be combined to recreate communications received at the satellite from a radioterminal.

The terrestrial gateway may be further configured to communicate a signal of the first service link antenna feed element with the satellite during a third time period. In addition, a second terrestrial gateway may be configured to communicate a signal of the second service link antenna feed element with the satellite during the third time period. The signals for the first and second service link antenna feed elements may include components of communications for first and second radioterminals located in geographically separated coverage areas.

The terrestrial gateway may be further configured to provide the feeder link with the satellite and to communicate signals for first and second feed elements of the plurality of plurality of satellite service link antenna feed elements between the terrestrial gateway and the satellite over the feeder link during a third time period. Moreover, the signals of the first and second service link antenna feed elements may be separated by a third frequency offset in the feeder link frequency band during the third time period with the first and third frequency offsets being different and with the second and third frequency offsets being different. Moreover, the signals of the first and second feed elements may include components of communications with at least one radioterminal in communication with the satellite.

BRIEF DESCRIPTION OF THE DRAWINGS

FIG. 2*a* is a schematic diagram of frequency translators according to embodiments of the present invention.

FIG. 2*b* is a graph illustrating feeder link frequency spectrum allocations according to embodiments of the present invention.

DETAILED DESCRIPTION

Figure 1:
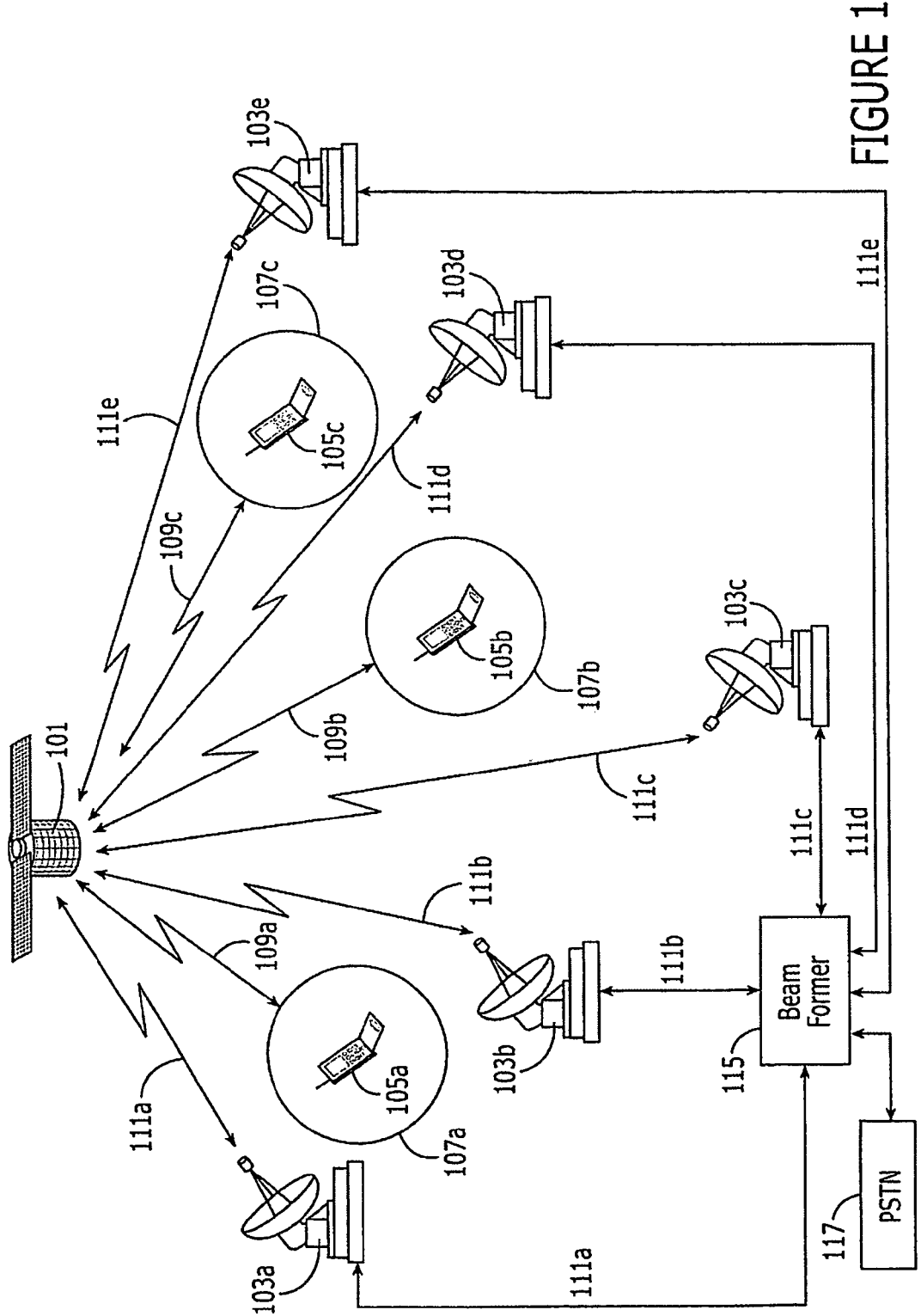
FIG. 1 is a diagram of satellite communications systems according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that although the terms first, second, third and fourth etc., may be used herein to describe various elements, these elements should not be limited by these terms. These terms are only used to distinguish one element from another element. Thus, for example, a first element below could be termed a second, third or fourth element, and similarly, a second element may be termed a first, third or fourth element etc., without departing from the teachings of the present invention. As used herein, the term "and/or"

includes any and all combinations of one or more of the associated listed items. The symbol "/" is also used as a shorthand notation for "and/or". As used herein, "substantially the same" band(s) means that two or more bands (i.e., bands of frequencies) substantially overlap (have common frequency content), but that there may be some areas of non-overlap, for example, at a band end and/or elsewhere. Moreover, "substantially the same" air interface(s) means that two or more air interfaces are similar but need not be identical. Some differences may exist between the two or more air interfaces to, for example, account for different characteristics and/or Quality-of-Service (QoS) goals of two or more respective systems, such as, for example, the different characteristic(s) and/or QoS goals between terrestrial and satellite systems. For example, respective different vocoder rates may be used for satellite communications and for terrestrial communications (for example, a 13 kbps vocoder rate may be used for terrestrial communications and a 4 kbps vocoder rate may be used for satellite communications). In addition, a different forward error correction coding, a different interleaving depth, and/or different spread spectrum codes (e.g. Walsh codes, long codes, and/or frequency hopping codes) may be used for satellite communications compared to respective parameters/quantities/algorithms that may be used for terrestrial communications. In general, "X and Y are substantially the same" means that X and Y have/share a plurality of identical and/or similar parameters and/or characteristics but X and Y may differ in at least one parameter and/or characteristic.

It will be understood that when an element is referred to as being "connected" or "coupled" to another element, it can be directly connected or coupled to the other element or intervening elements may be present. Furthermore, "connected" or "coupled" as used herein may include wirelessly connected or coupled. The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In a satellite communications system according to embodiments of the present invention, a Space-Based Component (SBC) 101 (such as a satellite) may relay communications between one or more radioterminals 105a-c and one or more geographically spaced-apart gateways 103a-e. More particularly, the space-based component 101 may relay communications using service links 109a-c for radioterminals in respective coverage areas 107a-c and using feeder links 111a-e for one or more respective gateways 103a-e. As shown, in FIG. 1, frequency reuse may be provided for feeder links by providing sufficient geographic separation of gateways 103a-e, and frequency reuse may be provided for service links by providing sufficient geographic separation of at least some of the coverage areas 107a-c. Moreover, in some embodiments, frequency reuse patterns may be provided such that overlapping or substantially overlapping coverage areas do not use the same service link and/or feeder link frequencies.

According to particular embodiments of the present invention, 10 MHz of spectrum may be dedicated and/or used for return service link transmissions from radioterminals to a space-based component; 10 MHz of spectrum may be dedicated and/or used for forward service link transmissions from the space-based component to radioterminals; 250 MHz of spectrum may be dedicated and/or used for return feeder link transmissions from the space-based component to a gateway; and 250 MHz of spectrum may be dedicated and/or used for forward feeder link transmissions from the gateway to the space-based component.

Moreover, the space-based component may include at least one service link antenna for service link beam forming (service link antenna pattern forming) including, for example, 120 return and/or 120 forward service link antenna feed elements (array of service link antenna elements) of the at least one service link antenna. Accordingly, signals for/from radioterminals (including radioterminals 105a-c) may be transmitted to and/or received from geographically separated coverage areas 107a-c using the same or substantially the same forward/return service link frequencies at the same time by providing different complex weights to the signals to be transmitted/received using the array of service link antenna elements over different spot-beams for respective ones of the service links 109a-c. While particular bandwidth allocations (i.e., 10 MHz of spectrum) and/or antenna configurations are discussed herein by way of example, it will be understood that different bandwidth allocations and/or antenna configurations may be implemented according to other embodiments of the present invention.

In some embodiments, at least some return service link antenna elements of the SBC may be configured to receive information from radioterminals using two different polarizations, that may be substantially orthogonal therebetween, such as, for example, a substantially Left Hand Circular Polarization (LHCP) and a substantially Right Hand Circular Polarization (RHCP), further increasing a bandwidth requirement of a return feeder link. In such embodiments, the return feeder link may be configured to transport information to a processing facility (i.e., a satellite gateway) using two different polarizations such as, for example, a substantially Vertically-oriented (V-oriented) polarization and a substantially Horizontally-oriented (H-oriented) polarization. In some embodiments, for example, information received by the SBC from radioterminals via the substantially RHCP may be transported by the return feeder link to a processing facility using the substantially V-oriented polarization and information received by the SBC from radioterminals via the substantially LHCP may be transported by the return feeder link to the processing facility using the substantially H-oriented polarization. In addition, the information received by the SBC over the substantially RHCP and LHCP may be transported to the processing facility by the return feeder link over the substantially V-oriented and H-oriented polarizations, respectively, while maintaining substantial frequency alignment between information that is correlated and is being transported over the substantially V-oriented and H-oriented polarizations, respectively. That is, the RHCP and LHCP components of a signal received at one or more return link antenna element(s) of the SBC may contain substantially identical and correlated frequency content therebetween (i.e., a radioterminal configured to transmit substantially linearly-polarized electromagnetic energy transmits approximately half of the energy in a substantially RHCP and approximately half of the energy in a substantially LHCP). As such, corresponding RHCP and LHCP signals received at the SBC that are correlated (include substantially identical frequency content) may be transported to the processing facility via, for example, the substantially V-oriented and H-oriented polarizations of a return feeder link, respectively, while maintaining substantial frequency alignment therebetween over the return feeder link. Thus, any leakage from one polarization into the other (as may be caused by atmospheric effects and/or by a non-ideally orthogonal state between the V-oriented and H-oriented polarizations of the return feeder link) may be leakage between two correlated components of a signal (i.e., between the RHCP and LHCP components of a signal as the two components are being transported to the processing facility by the return feeder link) and may thus be effectively utilized by a receiver at the processing facility that may be configured to combine the two components of the signal received over the feeder link's V-oriented and H-oriented dimensions. While in some embodiments at least some service link antenna (feed) elements of the SBC may be configured to receive information from radioterminals in a substantially RHCP and LHCP orientation, at least some service link antenna (feed) elements of the SBC may be configured to transmit information to radioterminals in a substantially RHCP orientation only and/or at least some service link antenna (feed) elements of the SBC may be configured to transmit information to radioterminals in a substantially LHCP orientation only.

Moreover, service link beam forming (antenna pattern forming) may be performed using a Ground-Based Beam Former (GBBF) 115 coupled to one or more of the gateways 103*a-e* as shown in FIG. 1. A multi-spot beam satellite system using ground-based beam forming may require a significant amount of feeder link bandwidth because of a plurality of forward/return service link antenna feed elements of the space-based component 101 that may be used for service link beam forming and a requirement to transport to/from the plurality of service link antenna feed elements from/to a ground-based beam former 115 a plurality of signals associated with forming the service link beams (antenna patterns). For example, ground-based beam forming for return service links of a satellite system may require that the signals received from radioterminals by the plurality of return service link antenna feed elements of the space-based component 101 be sent, for example, to a satellite gateway(s) via the system's feeder link frequencies to serve as inputs to a ground-based beam former 115.

A Space-Based Component (SBC), such as a satellite, may be configured to perform return link signal processing relating to Ground-Based Beam Forming (GBBF) wherein a first plurality of signals, corresponding to a plurality of return service link antenna elements (also referred to as return service link antenna feed elements) of the SBC, are transported by the SBC via one or more return feeder links to a processing facility (e.g., a ground facility such as one or more satellite gateways). The SBC may also be configured to perform forward link signal processing relating to GBBF wherein a second plurality of signals, corresponding to a plurality of forward service link antenna elements (also referred to as forward service link antenna feed elements) of the SBC are transported from a processing facility (e.g., a ground facility, such as one or more satellite gateways), via one or more forward feeder links to the SBC and to the respective plurality of forward service link antenna elements of the SBC. It will be understood that the term GBBF as used herein includes any type of antenna pattern forming, corresponding to a forward and/or return link of the SBC, irrespective of whether the antenna pattern forming is performed at a ground-based facility (fixed, transportable or mobile), at a maritime facility, at an aeronautical facility and/or in a distributed fashion between facilities (ground-based and/or non-ground-based).

For example, if a space-based component 101 is configured with 120 return service link antenna feed elements, and if the return service link of the space-based component 101 is allocated and using 10 MHz of spectrum, then 1.2 GHz (e.g. 120×10 MHz=1.2 GHz) of feeder link spectrum may be required to transmit all of the return service link antenna feed element signals to the ground. Furthermore, if the system is authorized to use, for example, only 250 MHz of return feeder link spectrum, the space-based component 101 may need to be configured to spatially-reuse the limited return feeder link spectrum bandwidth (250 MHz) a plurality of times (five-fold) by forming (five) return link feeder spot beams using respective feeder links 111*a-e* that transmit information to (five) respective geographically spaced-apart gateways 103*a-e*. Analogous requirements may apply when forming forward service link beams at a ground based beam former.

Multi-fold spatial reuse of a limited available bandwidth of a feeder link spectrum may introduce additional complexity and cost to the satellite system that may not be necessary when such a system is initially deployed. Upon initial deployment of the system and/or during an initial service period of the system, for example, a communications traffic measure of the system may be below a threshold. As the system's communications traffic increases, a larger portion of the system's service link bandwidth may be required for use, and the system's operator may undertake, at that time, additional complexity and cost associated with multi-fold spatial reuse of a limited feeder link bandwidth. With the satellite deployed and configured to initiate multi-fold spatial reuse of the forward and/or return feeder link frequencies responsive to ground commands, the system's operator may, at any time following initial deployment of the system, reconfigure the system's ground infrastructure for multi-fold spatial reuse of forward and/or return feeder link frequencies and command the space-based component (including one or more satellites) to initiate multi-fold spatial reuse of at least a portion of the system's forward and/or return feeder link spectrum.

FIG. 2*a* illustrates N return service link antenna feed elements generating respective return service link antenna feed element signals A1, A2, . . . , AN (A1-AN) at space-based component 101 by receiving signals from a plurality of radioterminals (e.g. radioterminals 105*a-c*). According to some embodiments, the space-based component 101 may include a service link antenna with 120 return service link antenna feed elements such that N=120. Moreover, each return service link antenna feed element signal A1-AN received over a respective return service link antenna feed element may be filtered using a respective front-end filter F1, F2, . . . , FN (such as a band-pass filter), and may be amplified using a respective Low Noise Amplifier (LNA, not shown in FIG. 2*a*). Each of the return service link antenna feed element signals A1-AN may then be translated (shifted) in frequency by a respective amount using respective return link frequency translators FT1, FT2, . . . , FTN (FT1-FTN).

In some embodiments, the $i^{th}$ return service link antenna feed element signal Ai, where ($1 \leq i \leq N$), is frequency translated (frequency shifted) by an amount equal to, or approximately equal to, $f_0 + (i-1)\Delta f$ where $\Delta f$ is equal to, approximately equal to, or less than 2 MHz. Following frequency translation (shifting) of the return service link antenna feed element signals, as described above and as illustrated in FIG. 2a, each frequency translated return service link antenna feed element signal may be further filtered, amplified and/or frequency translated (not illustrated in FIG. 2a). At least some of the processed (as discussed above and illustrated in FIG. 2a) return service link antenna feed element signals A1-AN may be combined using a summer Σ, according to some embodiments of the present invention, to form a feeder link signal that is transmitted by the space-based component 101, using feeder link frequencies, to one or more gateways 103a-e. A plurality of the return service link antenna feed element signals A1-AN (originally received over a substantially common return service link spectrum) may thus be frequency translated to occupy substantially non-overlapping portions of a return feeder link spectrum and transmitted over a return feeder link to a same gateway 103a-e.

According to some embodiments of the present invention, a satellite communications system may be authorized a bandwidth of 250 MHz of return feeder link spectrum, and 10 MHz of return service link spectrum. Moreover, the satellite system may include one space-based component 101 (e.g. one satellite) configured with 120 return service link antenna feed elements. Moreover, the one space-based component 101 may be initially configured with $\Delta f \approx 2$ MHz, and the system may initially use approximately only 1 MHz of the 10 MHz of its available return service link spectrum for communications from radioterminals to the space-based component 101. Accordingly, all received return service link antenna feed element signals A1-AN (N=120) may be frequency staggered, over respective substantially non-overlapping frequency intervals, superimposed and relayed to a single satellite gateway (such as gateway 103a) over a single return feeder link beam corresponding to a return feeder link antenna pattern (spot beam or global beam), such as a return portion of feeder link 111a, while not exceeding the system's authorized return feeder spectrum bandwidth of 250 MHz, as is further shown in FIG. 2b.

At the satellite gateway 103a and/or beam former 115, the frequency-staggered and superimposed return service link antenna feed element signals A1-AN may thus be received over the return portion of feeder link 111a. The return service link antenna feed element signals may then be block filtered, amplified, separated by respective narrow-band filters, respectively frequency translated to occupy a substantially common frequency interval, appropriately weighted in amplitude and/or phase, and combined in respective combinations to form respective return service link beams. A system operator may thus have flexibility to defer expending additional capital for multiple ground-based gateways 103b-e until a time when the system's communications needs may no longer be satisfactorily accommodated by approximately 2 MHz, or less, of return service link spectrum.

It will be understood that even though embodiments discussed above with respect to FIGS. 1 and 2a-b have been presented relative to the return service and feeder links of satellite systems, analogous and corresponding embodiments, systems and methods will occur to those skilled in the art for the forward service and feeder links of a satellite system. For example, a forward link communications signal (i.e., a voice and/or a data signal) that is intended for a given forward service link beam of a satellite may, at a satellite gateway and or beam former 115, be replicated, up to M or less than M times where M denotes a number of forward service link antenna feed elements of the satellite. Moreover, each signal replica may be weighted and/or modified by a complex weight (amplitude and/or phase value). The weighted/modified forward communications link signal replicas may then be respectively staggered in frequency, combined (superimposed and/or summed) with each other (and with other sets of replicated, weighted and frequency staggered communications signals that may be intended for the same and/or different forward service link beams of the satellite) in substantially a non-frequency overlapping fashion and transmitted to the satellite over a forward feeder link whose bandwidth is less than or equal to the forward feeder link bandwidth authorization of the system. At the satellite, the up to M substantially non-overlapping in frequency (frequency-staggered) components of the received forward feeder link signal may be separated by narrow-band filters, amplified and/or frequency translated (not necessarily in that order), each configured over a substantially common forward service link band of frequencies (authorized to the system) applied to respective forward service link antenna feed elements of the satellite and transmitted respectively therefrom.

Figure 3:
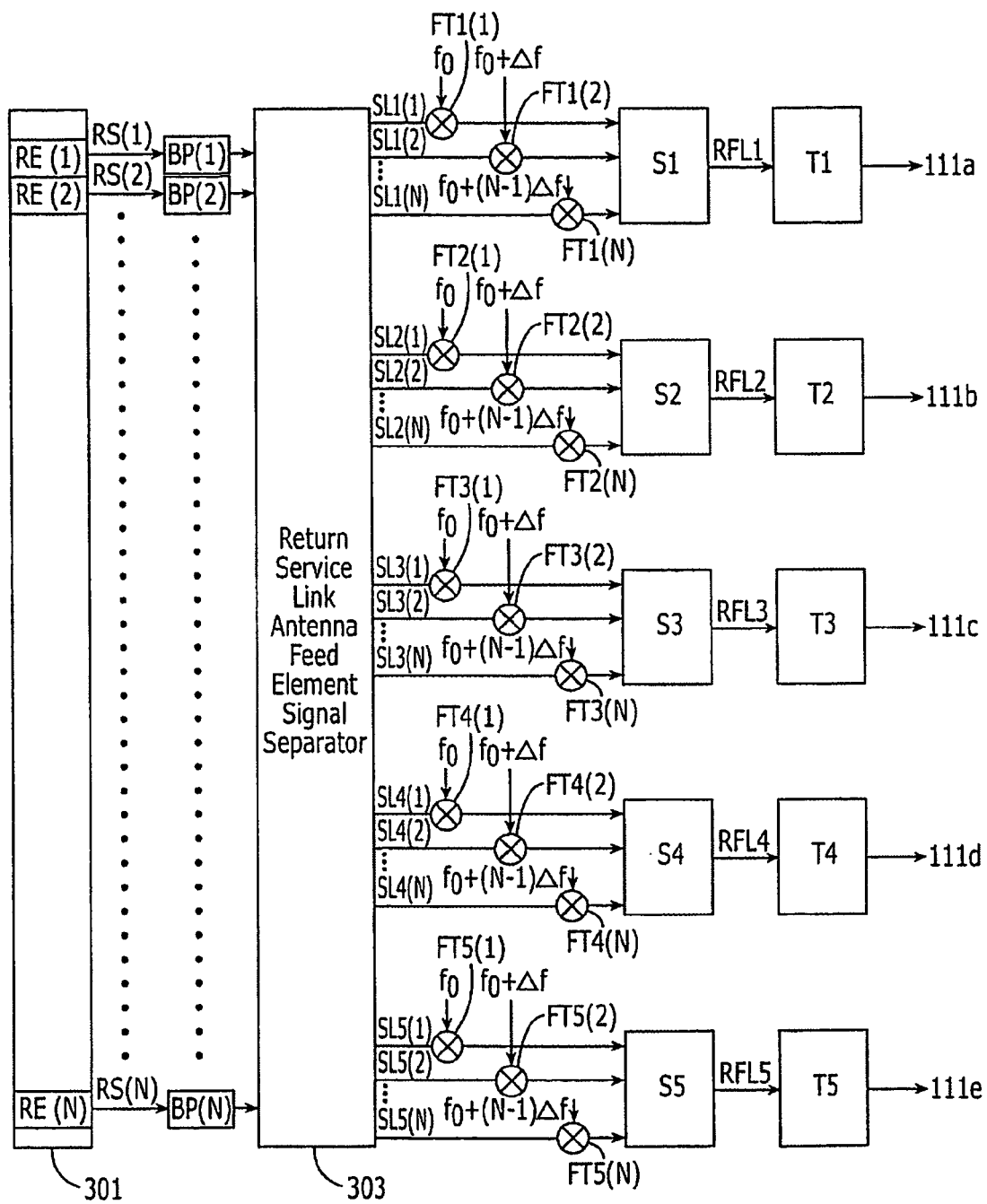
FIG. 3 is a block diagram illustrating return signal frequency translation according to embodiments of the present invention.
Figure 6:
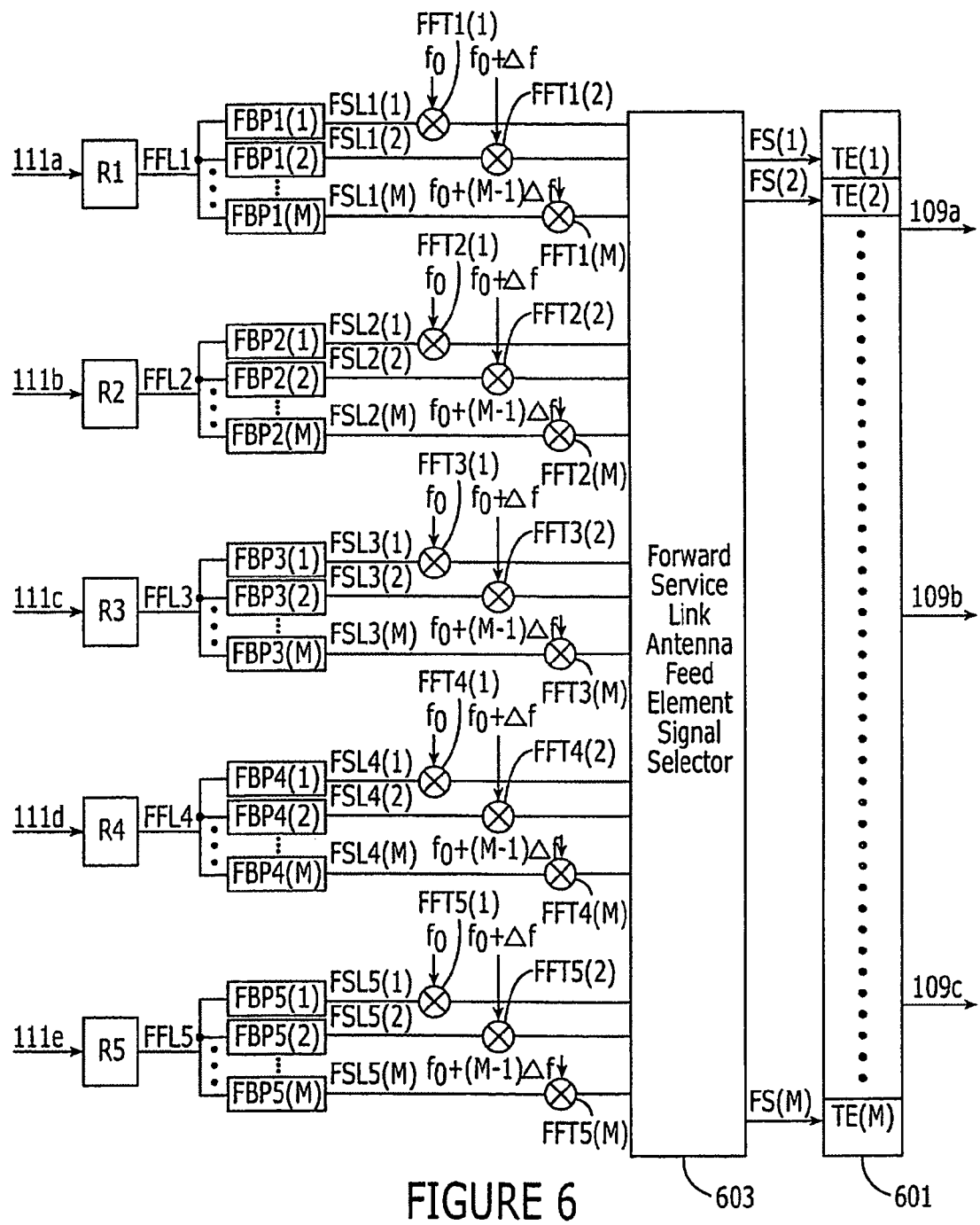
FIG. 6 is a block diagram illustrating forward signal frequency translation according to embodiments of the present invention.
Figure 9:
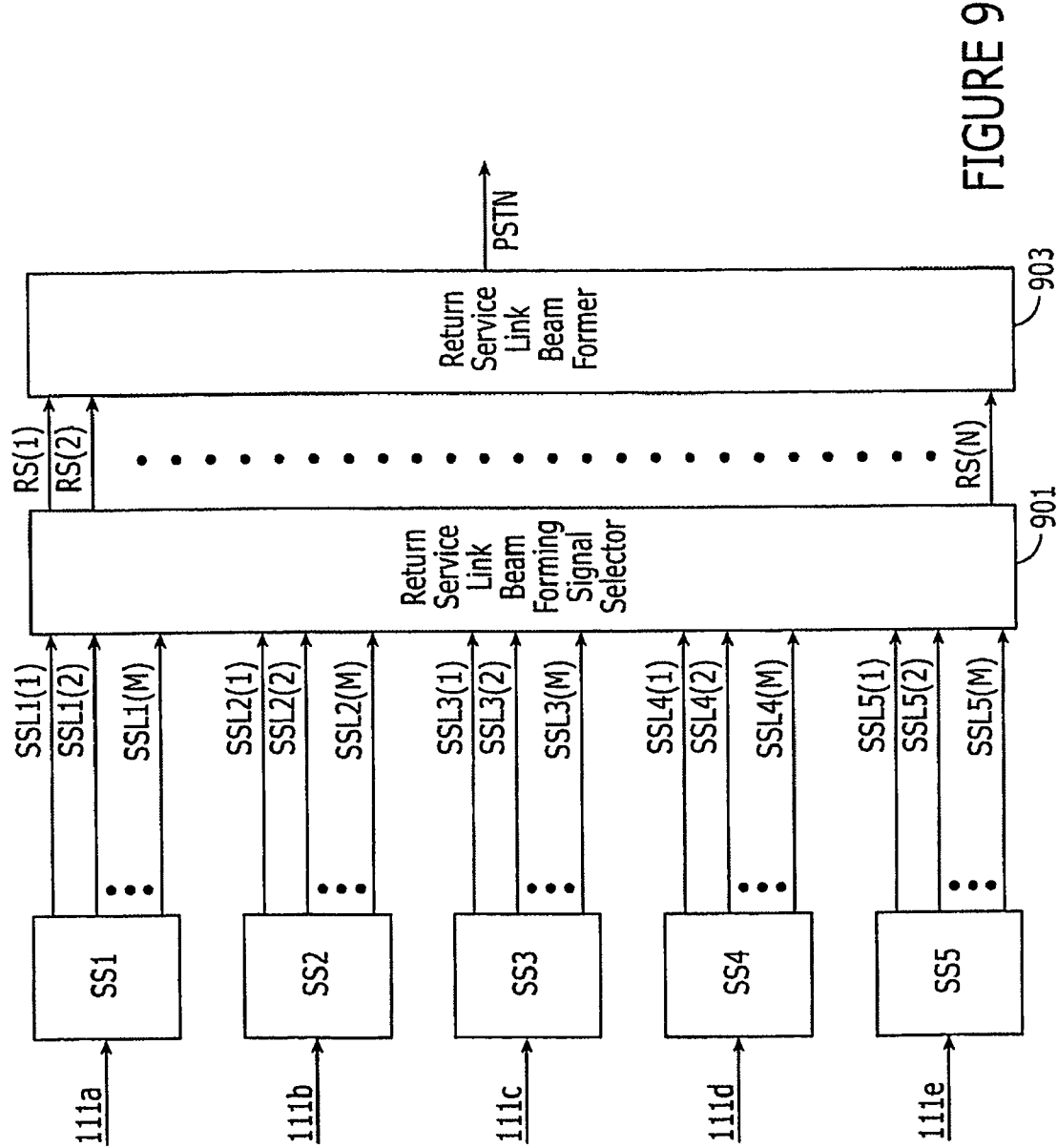
FIG. 9 is a block diagram illustrating ground based return link beam forming according to embodiments of the present invention.
Figure 10:
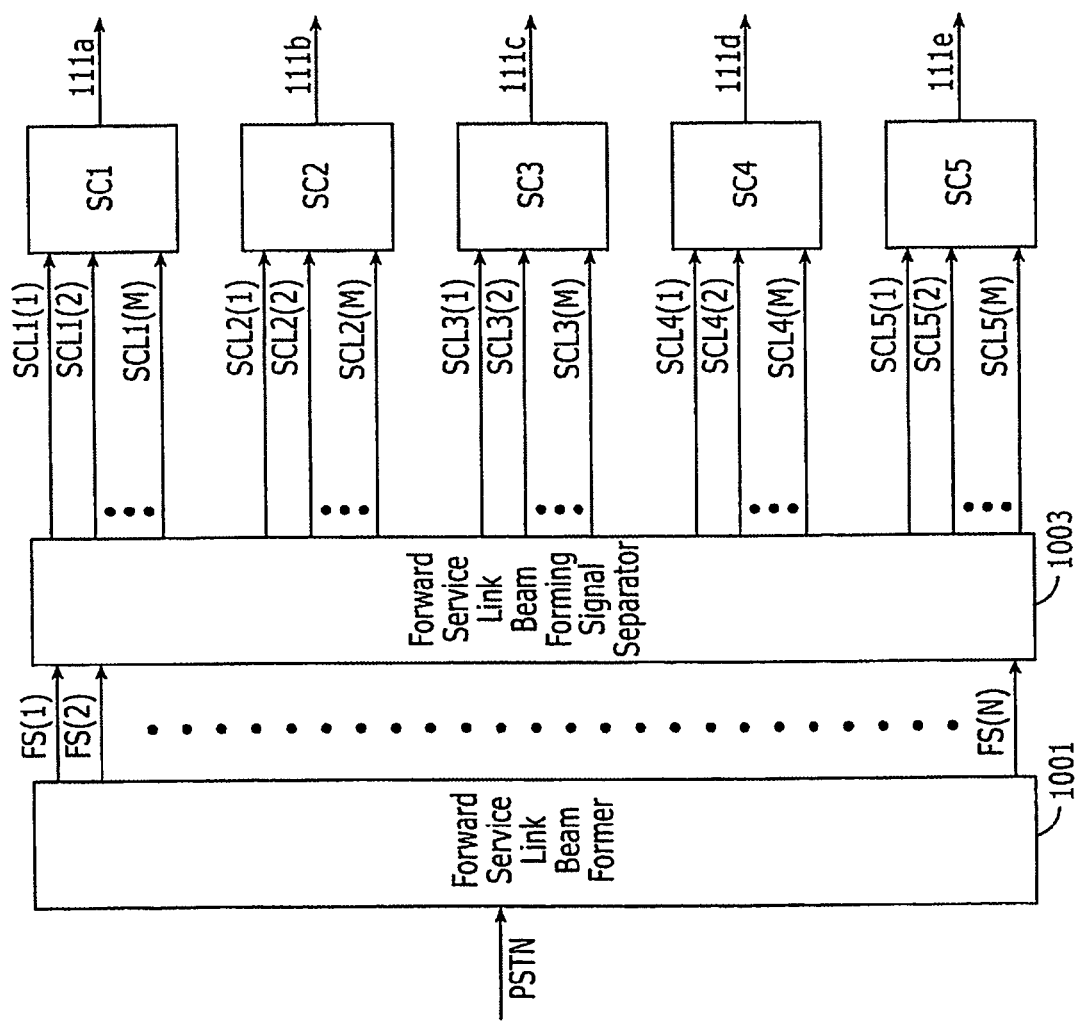
FIG. 10 is a block diagram illustrating ground based forward link beam forming according to embodiments of the present invention.

Additional embodiments of the present invention are discussed below with reference to FIGS. 3, 6, 9, and 10. More particularly, FIG. 3 is a block diagram of a return service link frequency translator for the space-based component 101, and FIG. 9 is a block diagram of a return service link beam former for the beam former 115 according to some embodiments of the present invention. FIG. 6 is a block diagram of a forward link frequency translator for the space-based component 101, and FIG. 10 is a block diagram of a forward service link beam former for the beam former 115 according to some other embodiments of the present invention.

The return service link frequency translator of FIG. 3 may be configured for operation in a space-based component 101 with a return service link antenna 301 including N return service link antenna feed elements RE(1)-RE(N), wherein each return service link antenna feed element may generate and/or intercept a respective return service link signal RS(1)-RS(N). The return service link antenna, for example, may include 120 return service link antenna feed elements (such that N=120) generating and/or intercepting 120 return service link signals RS(1)-RS(120). Moreover, the return service link frequency translator, the return service link antenna, and the space-based component may be configured for operation in a communications system allowing and/or using, for example, up to 10 MHz of spectrum for return service link communications received over service links 109a-c at the return service link antenna 301, and up to, for example, 250 MHz of spectrum for return feeder link communications transmitted by transmitters T1-T5 over feeder links 111a-e.

As discussed above, each return service link antenna feed element RE(1)-RE(N) of return service link antenna 301 may be configured to receive signals over a whole range of a return service link spectrum (for example, having a bandwidth of 10 MHz), and each return service link signal RS(1)-RS(N) may thus occupy the whole range of the return service link spectrum. According to particular examples discussed herein, each return service link signal RS(1)-RS(N) may have a bandwidth of up to 10 MHz. Moreover, respective band-pass filters BP(1)-BP(N) may be provided for each of the return service link signals RS(1)-RS(N). Each band-pass filter BP(1)-BP(N) may substantially block frequencies outside the return service link spectrum bandwidth (for example, having a pass-band bandwidth of approximately 10 MHz). Moreover, at least some of the band-pass filters BP(1)-BP(N) may be adaptable to provide a narrower pass-band bandwidth if less than all of the allocated return service link spectrum bandwidth is being used by the space-based component 101 and/or radioterminals communicating therewith, such as radioterminals 105a-c.

The return service link antenna feed element signal separator 303 may be configured to select particular components, and/or particular ones, of the return service link signals RS(1)-RS(N) for transmission over respective feeder links 111a-111e. As shown, up to N first return service link signal components and/or return service link signals may be coupled to a first summer S1 and a first transmitter T1 using some or all of signal lines SL1(1)-SL1(N) and some or all of return service link frequency translators FT1(1)-FT1(N); up to N second return service link signal components and/or return service link signals may be coupled to a second summer S2 and a second transmitter T2 using some or all of signal lines SL2(1)-SL2(N) and return service link frequency translators FT2(1)-FT2(N); etc. More particularly, up to N signal lines SL and up to N return service link frequency translators FT may be provided between the return service link antenna feed element signal separator 303 and each of the summers S1-S5 so that the return service link antenna feed element signals RS(1)-RS(N), elements and/or components thereof can be coupled to the summers S1-S5 depending on a utilization of the system. It will be understood that although FIG. 3 illustrates coupling of first through fifth return service link signal components and/or signals to respective first through fifth summers and transmitters, in some embodiments, there may be more, or less, than the five paths illustrated in FIG. 3. In some embodiments, there may be λ paths where λ can be any positive integer greater than zero.

While a plurality of separate transmitters T1-5 are shown in FIG. 3 for purposes of illustration, the different feeder links 111a-e may be transmitted from a same phased array antenna at the satellite over different spot beams to the geographically separated gateways 103a-e and/or the different feeder links may be transmitted from different directional antennas. Moreover, instead of a signal separator 303 and 5*N frequency translators, the same functionality may be provided using N frequency translators coupled between respective band-pass filters BP(1)-BP(N) and an adaptive switching circuit such that the adaptive switching circuit is between the frequency translator outputs and the summers S1-S5. In such a configuration, outputs of the frequency translators may be adaptively switched to the summers S1-S5 to provide the functionality discussed herein.

The return feeder links 111a-e may be received at respective gateways 103a-e and provided to the ground-based beam former 115. At the ground-based beam former 115, each of the return feeder links 111a-e may be processed using a respective signal separator SS1-SS5, as shown for example in FIG. 9. In particular, each signal separator SS1-SS5 may perform return signal separation (for example using band-pass filters) and frequency shifting (for example using frequency translators) so that, depending on a configuration and/or mode of operation, some or all of predetermined return service link antenna feed element signals and/or components thereof RS(1)-RS(N) are provided on respective predetermined signal separator lines SSL1(1)-SSL1(N), SSL2(1)-SSL2(N), SSL3(1)-SSL3(N), SSL4(1)-SSL4(N), and/or SSL5(1)-SSL5(N) over a substantially same (common) frequency band and/or set of frequencies. Each of the signal separators SS1-SS5, for example, may be implemented with at most N band-pass filters and at most N frequency translators coupled to the respective signal separator lines using a structure of band-pass filters and frequency translators analogous to that illustrated in FIG. 6 and discussed in greater detail below. More particularly, the signal separator SS1 may be implemented with a structure as illustrated in FIG. 6 including a set of at most N band-pass filters FBP1(1)-FBP1(N) and frequency translators FFT1(1)-FFT1(N).

The return service link beam forming signal selector 901 may be configured to select signals from the signal separator lines SSL1(1)-SSL1(N), SSL2(1)-SSL2(N), SSL3(1)-SSL3(N), SSL4(1)-SSL4(N), and/or SSL5(1)-SSL5(N) to be provided as return service link signals RS(1)-RS(N) and/or components thereof to the return service link beam former 903. If all return service link signals RS(1)-RS(N) are provided over return feeder link 111a, for example, the return service link signals may be provided over signal separator lines SSL1(1)-SSL1(N) and coupled through the return service link beam forming signal selector 901 to the return service link beam former 903. If the return service link signals are evenly distributed or approximately evenly distributed over the return feeder links 111a-e, a first set of return service link signals may be provided on a first set of signal selector lines; a second set of return service link signals may be provided on a second set of signal selector lines, etc., through the return service link beam forming signal selector 901 to the return service link beam former 903.

Using the return service link antenna feed element signals RS(1)-RS(N), the return service link beam former 903 may generate particular communications signals for transmission to other communications networks and/or devices. For example, the return service link beam former 903 may generate communications signals for transmission through a public switched telephone network (PSTN) 117 to one or more wire-line telephones and/or wireless radioterminals; through the same or a different space-based network to one or more other radioterminals; through an ancillary or other terrestrial network to one or more radioterminals; and/or through a data network such as the Internet and/or an Intranet to one or more computing and/or data devices.

When initially deployed, for example, a sufficiently narrow slice (portion) of an available return service link spectrum bandwidth may be used such that all N return service link signals RS(1)-RS(N), that are information bearing, can be transmitted over a single return feeder link 111a. Accordingly, the return service link antenna feed element signal separator 303 may couple all of the return signals RS(1)-RS(N) to the first summer S1 and the first feeder link transmitter T1 (using signal lines SL1(1)-SL1(N) and return service link frequency translators FT1(1)-FT1(N)), with no return service link signals being coupled to the other summers S2-S5 and/or feeder link transmitters T2-T5. Each of the return service link frequency translators FT(1)-FT(N) may be configured with $f_o$ selected to translate the return service link signals from the return service link frequency spectrum to the feeder link frequency spectrum and with $\Delta f$ configured so that the return feeder link signals are substantially non-overlapping in the return feeder link frequency spectrum. Here $\Delta f$ may be calculated as approximately (return feeder link spectrum bandwidth)/N or less. At the beam former 115, all N return signals RS(1)-RS(N) can thus be provided through return feeder link 111a and processed using the signal separator SS1, the return service link beam forming signal selector 901, and the return service link beam former 903.

With increasing service link spectrum usage, two feeder links 111a and 111b may be needed to transmit all of the return service link signals RS(1)-RS(N) to two geographically separated gateways 103a and 103b. The return service link antenna feed element signal separator 303 may thus couple a first half, or approximately a first half of the return service link signals to the first summer S1 and the first feeder link transmitter T1 (using one half of, or approximately one half of, the signal lines SL1(1)-SL1(N) and one half of, or approximately one half of, the return service link frequency translators FT1(1)-FT1(N)). In addition, the return service link antenna feed element signal separator 303 may couple a second half, or approximately a second half, of the return service link signals to the second summer S2 and the second feeder link transmitter T2 (using one half, or approximately one half, of signal lines SL2(1)-SL2(N) and one half, or approximately one half, of return service link frequency translators FT2(1)-FT2(N)). In such a configuration, no return service link signals are coupled to the other summers S3-S5 or feeder link transmitters T3-T5. Each of the two equal or approximately equal portions of return link frequency translators FT1(1)-FT1(N) and FT2(1)-FT2(N) may be configured with $f_0$ selected to translate the return service link signals from the service link frequency spectrum to the return feeder link frequency spectrum and with $\Delta f$ configured so that the return service link signals for each return feeder link are substantially non-overlapping in the return feeder link frequency spectrum. A system capacity can thus be doubled by providing two return feeder links 111a-b transmitted to geographically separated gateways 103a-b. Here $\Delta f$ may be calculated as approximately 2*(return feeder link spectrum bandwidth)/N or less.

At the beam former 115, a first half (N/2), or approximately a first half, of the return service link signals RS(1)-RS(N) can thus be provided through return feeder link 111a, processed using the signal separator SS1, and provided on one half, or approximately one half, of signal separator lines SSL1(1)-SSL1(N). A second half (N/2), or approximately a second half, of the return signals RS(1)-RS(N) can be provided through return feeder link 111b, processed using the signal separator SS2, and provided on one half, or approximately one half, of signal separator lines SSL2(1)-SSL2(N). The first and second half, or approximately first and second half, of return service link signals RS(1)-RS(N) can be coupled from respective elements of the signal separator lines SSL1(1)-SSL1(N) and SSL2(1)-SSL2(N) through the return service link beam forming signal selector 901 to the return service link beam former 903.

With further increases in service link spectrum usage, three feeder links 111a-c may be needed to transmit all of the return signals RS(1)-RS(N) to three geographically separated gateways 103a-c. The return service link antenna feed element signal separator 303 may thus couple a first third, or approximately a first third, of the return service link signals RS(1)-RS(N) to the first summer S1 and the first feeder link transmitter T1 (using a third, or approximately a third, of signal lines SL1(1)-SL1(N) and a third, or approximately a third, of return link frequency translators FT1(1)-FT1(N)). In addition, the return service link antenna feed element signal separator 303 may couple a second third, or approximately a second third, of the return service link signals to the second summer S2 and the second feeder link transmitter T2 (using a third, or approximately a third, of signal lines SL2(1)-SL2(N) and a third, or approximately a third, of return service link frequency translators FT2(1)-FT2(N)). The return service link antenna feed element signal separator 303 may also couple a final third, or approximately a final third, of the return service link signals to the third summer S3 and the third feeder link transmitter T3 (using a third, or approximately a third, of the signal lines SL3(1)-SL3(N) and a third, or approximately a third, of the return service link frequency translators FT3(1)-FT3(N)). In such a configuration, no return service link signals are coupled to the other summers S4-S5 or feeder link transmitters T4-T5. Each of the return link frequency translators may be configured with $f_0$ selected to translate the return service link signals from the return service link frequency spectrum to the return feeder link frequency spectrum and with $\Delta f$ configured so that the return service link signals for each return feeder link are substantially non-overlapping in the return feeder link frequency spectrum. A system capacity can thus be tripled by providing three return feeder links 111a-c transmitted to three geographically separated gateways 103a-c. Here $\Delta f$ may be calculated as approximately 3*(return feeder link spectrum bandwidth)/N or less.

At the beam former 115, a first third (N/3), or approximately a first third, of the return service link signals RS(1)-RS(N) can thus be provided through return feeder link 111a, processed using the signal separator SS1, and provided on a third, or approximately a third, of signal separator lines SSL1(1)-SSL1(N). A second third (N/3), or approximately a second third, of the return service link signals can be provided through return feeder link 11b, processed using the signal separator SS2, and provided on a third, or approximately a third, of signal separator lines SSL2(1)-SSL2(N). A final third (N/3), or approximately a final third, of the return service link signals can be provided through return feeder link 111c, processed using the signal separator SS3, and provided on one third, or approximately one third, of signal separator lines SSL3(1)-SSL3(N). The three sets of one third, or approximately one third, of return signals can be coupled from the respective signal separator lines SSL1(1)-SSL1(N), SSL2(1)-SSL2(N), and SSL3(1)-SSL3(N) through the return service link beam forming signal selector 901 to the return service link beam former 903.

With still further increases in service link spectrum usage, up to four feeder links 111a-d may be needed to transmit all of the return signals RS(1)-RS(N) to up to four geographically separated gateways 103a-d. The return service link antenna feed element signal separator 303 may couple a first quarter, or approximately a first quarter, of the return service link antenna feed element signals RS(1)-RS(N) to the first summer S1 and the first feeder link transmitter T1 (using a fourth, or approximately a fourth, of the return link signal lines SL1(1)-SL1(N) and a fourth, or approximately a fourth, of the return link frequency translators FT1(1)-FT1(N)). In addition, the return service link antenna feed element signal separator 303 may couple a second quarter, or approximately a second quarter, of the return service link signals to the second summer S2 and the second feeder link transmitter T2 (using a fourth, or approximately a fourth, of return link signal lines SL2(1)-SL2(N) and a fourth, or approximately a fourth, of return link frequency translators FT2(1)-FT2(N)). The return service link antenna feed element signal separator 303 may also couple a third quarter, or approximately a third quarter, of the return service link signals to the third summer S3 and the third feeder link transmitter T3 (using a fourth, or approximately a fourth, of return link signal lines SL3(1)-SL3(N) and a fourth, or approximately a fourth, of return link frequency translators FT3(1)-FT3(N)). Moreover, the return service link antenna feed element signal separator 303 may couple a final quarter, or approximately a final quarter, of the return service link signals to the fourth summer S4 and the fourth feeder link transmitter T4 (using a fourth, or approximately a fourth, of return service link signal lines SL4(1)-SL4(N) and a fourth, or approximately a fourth, of return link frequency translators FT4(1)-FT4(N)). In such a configuration, no return service link signals are coupled to the fifth summer S5 or the fifth feeder link transmitter T5. Each of the return service link frequency translators FT1(1)-FT1(N), FT2(1)-FT2(N), FT3(1)-FT3(N), and FT4(1)-FT4(N) that are used may be configured with $f_0$ selected to translate the return service link signals from the return service link frequency spectrum to the return feeder link frequency spectrum and with $\Delta f$ configured so that the return service link signals for each return feeder link are substantially non-overlapping in the return feeder link frequency spectrum. A system capacity can thus be quadrupled by providing four return feeder links 111a-d transmitted to geographically separated gateways 103a-d. Here $\Delta f$ may be calculated as approximately 4*(return feeder link spectrum bandwidth)/N or less.

At the beam former 115, a first quarter, or approximately a first quarter, of the return service link signals RS(1)-RS(N) can thus be provided through return feeder link 111a, processed using the signal separator SS1, and provided on a fourth, or approximately a fourth, of signal separator lines SSL1(1)-SSL1(N). A second quarter, or approximately a second quarter, of the return service link signals can be provided through return feeder link 111b, processed using the signal separator SS2, and provided on a fourth, or approximately a fourth, of the signal separator lines SSL2(1)-SSL2(N). A third quarter, or approximately a third quarter, of the return service link signals can be provided through the return feeder link 111c, processed using the signal separator SS3, and provided on a fourth, or approximately a fourth, of the signal separator lines SSL3(1)-SSL3(N). A fourth quarter, or approximately a fourth quarter, of the return service link antenna feed element signals can be provided through return feeder link 111d, processed using the signal separator SS4, and provided on a fourth, or approximately a fourth, of signal separator lines SSL4(1)-SSL4(N). The four quarters, or the approximate four quarters (wherein some of the quarters may be exact quarters and some quarters may be approximate quarters), of the return service link signals can be coupled from the respective signal separator lines SSL1(1)-SSL1(N), SSL2(1)-SSL2(N), SSL3(1)-SSL3(N), and SSL4(1)-SSL3(N) through the return service link beam forming signal selector 901 to the return service link beam former 903.

With yet further increases in service spectrum usage, five feeder links 111a-e may be needed to transmit all of the return signals RS(1)-RS(N) to five geographically separated gateways 103a-e. The return service link antenna feed element signal separator 303 may thus couple a first fifth, or approximately a first fifth, of the return service link antenna feed element signals RS(1)-RS(N) to the first summer S1 and the first feeder link transmitter T1 (using a fifth, or approximately a fifth, of return service link signal lines SL1(1)-SL1(N) and a fifth, or approximately a fifth, of return service link frequency translators FT1(1)-FT1(N)). The return service link antenna feed element signal separator 303 may also couple a second fifth, or approximately a second fifth, of the return service link antenna feed element signals to the second summer S2 and the second feeder link transmitter T2 (using a fifth, or approximately a fifth, of the signal lines SL2(1)-SL2(N) and return service link frequency translators FT2(1)-FT2(N)). In addition, the return service link antenna feed element signal separator 303 may couple a third fifth, or approximately a third fifth, of the return service link antenna feed element signals to the third summer S3 and the third feeder link transmitter T3 (using a fifth, or approximately a fifth, of return service link signal lines SL3(1)-SL3(N) and a fifth, or approximately a fifth, of return service link frequency translators FT3(1)-FT3(N)). Moreover, the return service link antenna feed element signal separator 303 may couple a fourth fifth, or approximately a fourth fifth, of the return service link antenna feed element signals to the fourth summer S4 and the fourth feeder link transmitter T4 (using a fifth, or approximately a fifth, of return service link signal lines SL4(1)-SL4(N) and return service link frequency translators FT4(1)-FT4(N)). Finally, the return service link antenna feed element signal separator 303 may couple a final fifth, or approximately a final fifth, of the return service link antenna feed element signals to the fifth summer S5 and the fifth feeder link transmitter T5 (using a fifth, or approximately a fifth, of return service link signal lines SL5(1)-SL5(N) and a fifth, or approximately a fifth, of return service link frequency translators FT5(1)-FT5(N)). In such a configuration, return service link antenna feed element signals are coupled to all of the summers S1-S5 and to all of the feeder link transmitters T1-T5. Each of the return service link frequency translators that are used may be configured with $f_0$ selected to translate the return service link signals from the return service link frequency spectrum to the return feeder link frequency spectrum and with $\Delta f$ configured so that the return service link signals for each return feeder link are non-overlapping in the return feeder link frequency spectrum. A system capacity can thus be increased five fold by providing five return feeder links 111a-e transmitted to five respective geographically separated gateways 103a-e. Here $\Delta f$ may be calculated as approximately 5*(return feeder link spectrum bandwidth)/N or less.

At the beam former 115, a first fifth, or approximately a first fifth, of the return service link antenna feed element signals RS(1)-RS(N) can thus be provided through return feeder link 111a, processed using the signal separator SS1, and provided on one fifth, or approximately one fifth, of signal separator lines SSL1(1)-SSL1(N). A second fifth, or approximately a second fifth, of the return service link antenna feed element signals can be provided through return feeder link 111b, processed using the signal separator SS2, and provided on one fifth, or approximately one fifth, of signal separator lines SSL2(1)-SSL2(N). A third fifth, or approximately a third fifth, of the return service link antenna feed element signals can be provided through return feeder link 111c, processed using the signal separator SS3, and provided on a fifth, or approximately a fifth, of signal separator lines SSL3(1)-SSL3(N). Another fifth, or approximately another fifth, of the return service link antenna feed element signals can be provided through return feeder link 111d, processed using the signal separator SS4, and provided on one fifth, or approximately one fifth, of signal separator lines SSL4(1)-SSL4(N). A final fifth, or approximately a final fifth, of the return service link antenna feed element signals can be provided through return feeder link 111e, processed using the signal separator SS4, and provided on a fifth, or approximately a fifth, of signal separator lines SSL5(1)-SSL5(N). The five sets of return service link antenna feed element signals can be coupled from the five respective sets of signal separator lines through the return service link beam forming signal selector 901 to the return service link beam former 903.

Instead of a signal selector 901 used with N frequency translator and band-pass filter pairs at each of the signal separators SS1-5, the same functionality may be provided using an adaptive switching circuit to adaptively couple the feeder links 111a-e to N frequency translator and band-pass filter pairs, with each of the N frequency translator and band-pass filter pairs feeding a respective input of the beam former 903. In such a configuration, inputs to the frequency translator and band-pass filter pairs may be adaptively switched from the feeder links 111a-e to provide the functionality discussed herein.

According to embodiments discussed above, N return service link signal lines SL and N return service link frequency translators FT may be provided between the return service link antenna feed element signal separator 303 and each of the summers S1-S5 so that the return service link antenna feed element signals RS(1)-RS(N) can be adaptively coupled to the summers S1-S5 depending on a service link spectrum utilization of the system. For example, all N (or approximately all N) return service link signal lines SL1(1)-SL1(N) and all N (or approximately all N) return service link frequency translators FT1(1)-FT1(N) between return service link antenna feed element signal separator 303 and first summer S1 may be used when transmitting all N (or approximately all N) return service link antenna feed element signals over feeder link 111a (with none, or almost none, of the return service link signal lines or summers between the return service link antenna feed element signal separator 303 and summers S2-S5 being used). In contrast, one fifth, or approximately one fifth, of the return service link signal lines SL and one fifth, or approximately one fifth, of the return service link frequency translators FT between the return service link antenna feed element signal separator 303 and each of the summers S1-S5 may be used when the return service link antenna feed element signals are evenly, or approximately evenly, distributed over the five feeder links 111a-e. Accordingly, in some embodiments of the invention, N1 return service link signal lines SL1(1)-SL1(N1) and N1 return service link frequency translators FT1(1)-FT1(N1) may be provided between the return service link antenna feed element signal separator 303 and the first summer S1, where N1 is equal to N, or approximately equal to N; N2 return service link signal lines SL2(1)-SL2(N2) and N2 return service link frequency translators FT2(1)-FT2(N2) may be provided between the return service link antenna feed element signal separator 303 and the second summer S2, where N2 is equal to N/2, or approximately equal to N/2; N3 return service link signal lines and N3 return service link frequency translators, SL3(1)-SL3(N3) and FT3(1)-FT3(N3), respectively, may be provided between the return service link antenna feed element signal separator 303 and the third summer S3, where N3 is equal to N/3, or approximately equal to N/3; N4 return service link signal lines SL4(1)-SL4(N4) and N4 return service link frequency translators FT4(1)-FT4(N4) may be provided between the return service link antenna feed element signal separator 303 and the fourth summer S4, where N4 is equal to N/4, or approximately equal to N/4; and N5 return service link signal lines SL5(1)-SL5(N5) and N5 return service link frequency translators FT5(1)-FT5(N5) may be provided between the return service link antenna feed element signal separator 303 and the fifth summer S5, where N5 is equal to N/5, or approximately equal to N/5.

In some embodiments, some of the N, N/2, N/3, N/4 and N/5 (or approximately N, N/2, N/3, N/4 and N/5) sets of return service link lines and frequency translators provided between the signal separator 303 and the respective summers S1-S5, are utilized to a lesser extent as a service link spectrum utilization and/or ground facility (gateway) utilization of the system increases; other sets are utilized more. For example, when the system is utilizing five gateways the utilization of the N (or approximately N) return service link lines and frequency translators provided between the signal separator 303 and summer S1 is only one fifth (or approximately one fifth) of the utilization of the N (or approximately N) return service link lines and frequency translators provided between the signal separator 303 and summer S1 when, initially, the system is utilizing only one ground facility (gateway). In contrast to a final utilization of the N (or approximately N) return service link lines and frequency translators provided between the signal separator 303 and summer S1 reducing over time to one fifth (or approximately one fifth) of an initial utilization, a final utilization of return service link lines and frequency translators provided between the signal separator 303 and summer S5 increases from a minimum utilization of zero to a maximum utilization of N/5 (or approximately N/5) as the system increases a utilization of a number of ground facilities (gateways) from one to five.

Embodiments in which the N return service link antenna feed element signals are evenly distributed, approximately evenly distributed or un-evenly distributed over two or more return feeder links, as described above, may require a centralized ground-based beam forming architecture (for return and/or forward service link beam forming) wherein a subset of the N return service link antenna feed element signals that is transported via a return feeder link to a ground facility, such as a satellite gateway, is routed from the ground facility (gateway) to another ground facility that includes a ground-based beam former, such as a return service link beam former 903 and/or beam former 115, to be processed at the other ground facility by the beam former together with one or more other subsets of return service link antenna feed element signals that is provided to the other ground facility by one or more other return feeder links and/or ground facilities (gateways).

In other embodiments, a centralized ground-based beam forming architecture and the associated signal routing between two or more ground facilities (for the purpose of forming service link beams) may be avoided by configuring the return service link antenna feed element signal separator 303 alternatively. In accordance with such an alternate configuration, the return service link antenna feed element signal separator 303 does not provide substantially complete return service link antenna feed element signals to summers S1-S5 (with the possible exception of summer S1 during the period of time when service link spectrum utilization is small yielding relatively narrow-band return service link antenna feed element signals and allowing the system to operate with only one return feeder link and one ground facility (gateway)). Instead, the return service link antenna feed element signal separator 303 is configured to provide an element of a return service link antenna feed element signal at each one of its outputs wherein the element of the return service link antenna feed element signal includes a portion of a total frequency content of a respective return service link antenna feed element signal. As such, the N return service link signals that are provided to an $i^{th}$ summer, Si (i=1, 2, ... ), may be a complete set of return service link antenna feed element signals over a predetermined return service link frequency interval that is less than or equal to a bandwidth of a corresponding return feeder link, 111a-e, divided by N. With each one of the return feeder links 111a-e delivering to a corresponding ground facility (satellite gateway) a complete set, or substantially complete set, of the return service link antenna feed element signals over a predetermined frequency interval, enables the ground facility (gateway) to be configured with a return service link beam former, such as the return service link beam former 903, and form any desired return service link beam, over the entire service footprint of the system, over the predetermined frequency interval without needing and/or requiring any other return service link antenna feed element signal input(s) from any other facility (gateway). Thus, a distributed ground-based service link beam forming architecture may be configured wherein each of a plurality of ground facilities (gateways) may exercise independent control in forming service link beams (forward and/or return) over an entire service footprint of a system over a limited predetermined portion of the service link spectrum (return and/or forward).

While five feeder links 111a-b are shown by way of example, it will be understood, that any number of feeder links (greater than or equal to one) with corresponding return service link frequency translators and signal lines may be provided according to embodiments of the present invention. Moreover, even distribution of return service link signals across return feeder links is not required. In addition, couplings of return service link signals RS to signal lines SL through the return service link antenna feed element signal separator 303, the value of $\Delta f$, and a pass-band bandwidth of filters BP(1)-BP(N) may be changed based on commands transmitted to the space-based component 101 from a ground controller. Accordingly, utilization of available spectrum bandwidths can be adapted after deployment of the space-based component responsive, for example, to increasing system usage and/or availability of additional gateways 103. A value of $f_0$ may remain unchanged (even as a value of $\Delta f$ is changed) provided that allocations of return service link frequency spectrum and return feeder link frequency spectrum remain unchanged. In other embodiments, however, $f_0$ may be changed, for example, if a lowest used frequency of the return service link frequency spectrum changes. Moreover, forward and return portions of feeder links 111a-e need not be identical. In other words, forward and return portions of feeder links 111a-e may be asymmetric to support asymmetric communications such as Internet browsing where a return link may, for example, require less bandwidth than a forward link.

Embodiments of FIG. 3 will now be discussed, by way of example, with respect to particular examples of frequency spectrum allocations and usage. According to particular embodiments, the return service link antenna 301 may include 120 return service link antenna feed elements so that N=120, 10 MHz of frequency spectrum may be allocated for return service link transmissions from radioterminal(s) 105 to satellite 101, and 250 MHz of frequency spectrum may be allocated for return feeder link transmissions from satellite 101 to gateway(s) 103. FIGS. 4a-b and 5a-d illustrate respective frequency translations.

When such a communications system is first deployed, a full capacity thereof may not be needed. Of the 10 MHz of frequency spectrum allocated for return service link transmissions, for example, 1 MHz of frequency spectrum, or approximately 1 MHz of frequency spectrum, may be sufficient to satisfy initial demand. Accordingly, transmissions from radioterminals 105 may be limited to (or approximately limited to) a 1 MHz band of frequency spectrum, and the band-pass filters BP(1)-BP(120) may be configured to pass this 1 MHz (or approximately 1 MHz) band of frequency spectrum or may be configured to pass the entire 10 MHz of frequency spectrum allocated to the system for return service link communications. Moreover, the return service link antenna feed element signal separator 303 may couple all of the return service link antenna feed element signals RS(1)-RS(120) to the first summer S1 using 120 respective return service link signal lines SL1(1)-SL1(120) and 120 return service link frequency translators FT1(1)-FT1(120). Accordingly, summers S2-S5 and respective return feeder link transmitters T2-T5 may be idle. In this situation, $f_0$ may be a difference between a lowest frequency of the spectrum allocated for return service link communications and a lowest frequency of the spectrum allocated for return feeder link communications, and $\Delta f$ may be approximately equal to (or less than) a bandwidth of the frequency spectrum allocated for return feeder link communications divided by a number of return service link antenna feed element signals (120). More particularly, $\Delta f$ may be approximately equal to (or less than) 2 MHz (i.e. 250 MHz/120=2.08 MHz). While a $\Delta f$ of 2 MHz is used for purposes of explanation, $\Delta f$ can be as low as 1 MHz (or approximately 1 MHz), the bandwidth of frequency spectrum used for return service link transmissions, or as high as 2.08 MHz with the parameters set forth above.

Figure 4A:
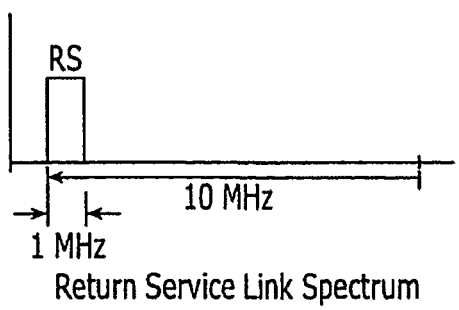
FIGS. 4*a-b* and 5*a-d* are graphs illustrating return signal frequency translation according to embodiments of the present invention.
Figure 4B:
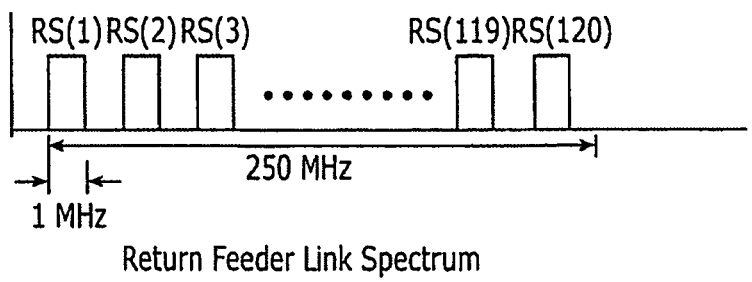

The return service link frequency translators FT1(1)-FT1(120) may thus translate (or shift) each of the return service link antenna feed element signals RS(1)-RS(120) in frequency so that each return service link antenna feed element signal RS(1)-RS(120) occupies a different portion of the return feeder link spectrum. As shown in FIG. 4a, each of the return service link antenna feed element signals RS(1)-RS(120) from respective elements of the return service link antenna 301 may occupy a same 1 MHz portion (or approximately 1 MHz portion) of the return service link frequency spectrum before frequency translation. As shown in FIG. 4b, each of the return service link antenna feed element signals RS(1)-RS(120) may be provided in non-overlapping portions of the return feeder link frequency spectrum after frequency translation has been performed with 2 MHz separation therebetween. The summer S1 can then combine the plurality of frequency translated (non-overlapping) return service link antenna feed element signals RS(1)-RS(120) into a return feeder link signal RFL1 that is transmitted over return feeder link 111a to a ground facility (satellite gateway) 103a using feeder link transmitter T1.

In the example of FIGS. 4a and 4b, additional system capacity may be provided by increasing the frequency interval occupied by return service link communications from a limit of 1 MHz (or approximately 1 MHz) to 2 MHz (or approximately 2 MHz). More particularly, up to 2 MHz of return service link frequency spectrum can be used with a $\Delta f$ of 2 MHz before additional feeder links and corresponding additional gateways may be required. Accordingly, an expense and/or complexity of multiple gateways can be avoided when such a communications system is initially deployed.

Figure 5A:
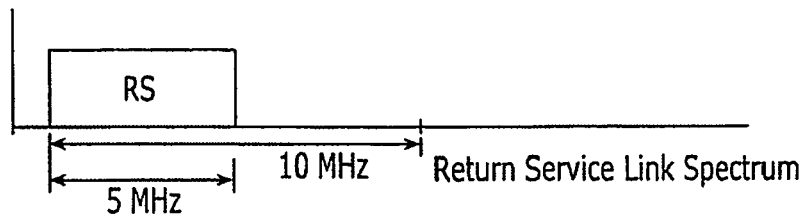

As a usage of the communications system increases, such as a service link spectrum usage, additional return service link capacity may be needed as shown, for example, in FIGS. 5a-d. For example, 5 MHz of the frequency spectrum allocated for return service link transmissions may be needed to satisfy demand. Accordingly, transmissions from radioterminals 105 may be allowed over a 5 MHz frequency spectrum as shown in FIG. 5a, and the band-pass filters BP(1)-BP(120) may be configured to pass this 5 MHz band of frequency spectrum. Moreover, the return service link antenna feed element signal separator 303 may couple return service link antenna feed element signals RS(1)-RS(40) to the first summer S1 (using return service link signal lines SL1(1)-SL1(40) and return service link frequency translators FT1(1)-FT1(40)). The return service link antenna feed element signal separator 303 may couple return service link antenna feed element signals RS(41)-RS(80) to the second summer S2 (using return service link signal lines SL2(1)-SL2(40) and return service link frequency translators FT2(1)-FT2(40)). In addition, the return service link antenna feed element signal separator 303 may couple the remaining return service link antenna feed element signals RS(81)-RS(120) to the third summer S3 (using a set of return service link signal lines SL3(1)-SL3(40) and return service link frequency translators FT3(1)-FT3(40)). Accordingly, summers S4-S5 and feeder link transmitters T4-T5 may be idle.

As before, $f_0$ may be a difference between a lowest frequency of the spectrum allocated for return service link communications and a lowest frequency of the spectrum allocated for return feeder link communications, and $\Delta f$ may be approximately equal to a bandwidth of the frequency spectrum allocated for return feeder link communications divided by a number of return service link antenna feed element signals transmitted over each feeder link being used (i.e. 40). More particularly, $\Delta f$ may be approximately equal to (or less than) 6.25 MHz (i.e. 250 MHz/40=6.25 MHz). While a Δf of 6.25 MHz is used for purposes of explanation, Δf can be as low as 5 MHz (the bandwidth of frequency spectrum used for return service link transmissions) or as high as 6.25 MHz with the parameters set forth above.

The return service link frequency translators FT1(1)-FT1(40) may thus translate (or shift) each of the return service link antenna feed element signals RS(1)-RS(40) in frequency so that each return service link antenna feed element signal RS(1)—RS(40) occupies a substantially different (substantially non-overlapping) portion of the return feeder link spectrum for transmission over return feeder link 111a. Similarly, the set of return service link frequency translators FT2(1)-FT2(40) may translate (or shift) each of the return service link antenna feed element signals RS(41)-RS(80) in frequency so that each return service link antenna feed element signal RS(41)-RS(80) occupies a substantially different (substantially non-overlapping) portion of the return feeder link spectrum for transmission over return feeder link 111b. In addition, the return service link frequency translators FT3(1)-FT3(40) may translate (or shift) each of the return service link antenna feed element signals RS(81)-RS(120) in frequency so that each return service link antenna feed element signal RS(81)-RS(120) occupies a substantially different (substantially non-overlapping) portion of the return feeder link spectrum for transmission over return feeder link 111c.

The summer S1 can be used to combine the frequency translated return service link antenna feed element signals RS(1)-RS(40) into a return feeder link signal RFL1 that is transmitted over return feeder link 111a to gateway 103a using feeder link transmitter T1. The summer S2 can be used to combine the frequency translated return service link antenna feed element signals RS(41)-RS(80) into a return feeder link signal RFL2 that is transmitted over return feeder link 111b to gateway 103b using feeder link transmitter T2. The summer S3 can be used to combine the frequency translated return service link antenna feed element signals RS(81)-RS(120) into a return feeder link signal RFL3 that is transmitted over return feeder link 111c to gateway 103c using feeder link transmitter T3.

Figure 5B:
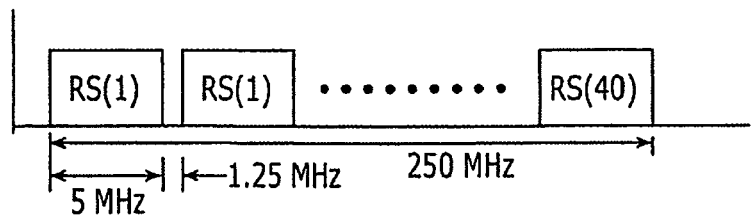
Figure 5C:
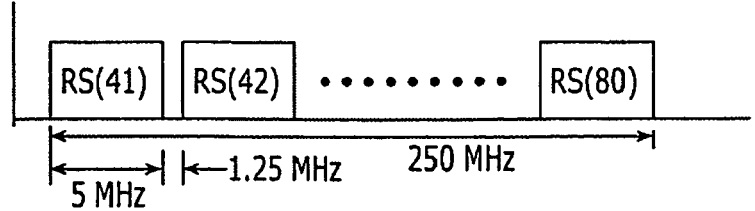
Figure 5D:
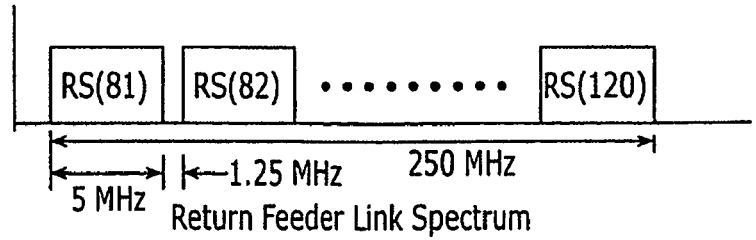

As shown in FIG. 5a, each of the return service link antenna feed element signals RS(1)-RS(120) from respective elements of the return service link antenna 301 may occupy a substantially same 5 MHz band of the return service link frequency spectrum before frequency translation. As shown in FIG. 5b, each of the return service link antenna feed element signals RS(1)-RS(40) may be provided in substantially non-overlapping portions of the return feeder link frequency spectrum after frequency translation with 6.25 MHz separation therebetween for transmission over return feeder link 111a. As shown in FIG. 5c, each of the return service link antenna feed element signals RS(41)-RS(80) may be provided in substantially non-overlapping portions of the return feeder link frequency spectrum after frequency translation with 6.25 MHz separation therebetween for transmission over return feeder link 111b. As shown in FIG. 5d, each of the return service link antenna feed element signals RS(81)-RS(120) may be provided in substantially non-overlapping portions of the return feeder link frequency spectrum after frequency translation with 6.25 MHz separation therebetween for transmission over return feeder link 111c. Interference between return feeder links 11a-c (inter-feeder link interference) may be mitigated by transmitting the return feeder links 111a-c as spot-beams to geographically separated gateways 103a-c.

In the example of FIGS. 5a-d, additional system capacity may be provided by allowing return service link signals to occupy, in the aggregate, a bandwidth of up to 6.25 MHz. More particularly, up to 6.25 MHz of return service link frequency spectrum can be used with a Δf of 6.25 MHz before additional feeder links and/or gateways may be required.

The examples of FIGS. 4a-b and 5a-d are provided to illustrate particular embodiments providing one and three return feeder links. It will be further understood that principles illustrated in FIGS. 4a-b and 5a-d can be used to adaptively transmit return service link antenna element signals over any number of return feeder links to geographically separated gateways.

The adaptive forward link frequency translator of FIG. 6 may be configured for operation in a space-based component 101 with a forward service link antenna 601 including M forward service link antenna feed elements, and each forward service link antenna feed element may be driven by a respective forward service link antenna feed element signal FS(1)-FS(M). The forward service link antenna 601, for example, may include 120 forward service link antenna feed elements (such that M=120) responsive to 120 forward service link antenna feed element signals FS(1)-FS(120). In general, M may be any positive integer value greater than or equal to one (and M, in some embodiments, need not be equal to N). Moreover, the adaptive forward link frequency translator, the forward service link antenna, and the space-based component may be configured for operation in a communications system allowing up to 10 MHz of spectrum bandwidth for forward service link communications transmitted over service links 109a-c from the forward service link antenna 601 to one or more radioterminals such as radioterminals 105a-c, and up to 250 MHz of spectrum bandwidth for forward feeder link communications received at receivers R1-R5 of space-based component 101 over the respective forward feeder links 111a-e.

As discussed above, each forward service link antenna feed element of the set TE(1)-TE(M) of the forward service link antenna 601 may be configured to transmit signals over a whole range of forward service link spectrum (for example, having a bandwidth of 10 MHZ), and each forward service link antenna feed element signal of the set FS(1)-FS(M) may thus occupy the whole range of the forward service link spectrum. According to particular examples discussed herein, each forward service link antenna feed element signal FS(1)-FS(M) may have a bandwidth of up to 10 MHz. Moreover, each forward feeder link receiver R1-R5 may be configured to generate respective forward feeder link signals FFL1-FFL5 responsive to transmissions from respective gateways 103a-e received over forward feeder links 111a-e. Each forward feeder link receiver R1-R5 may thus be configured to receive communications over a respective forward feeder link and to generate respective forward feeder link signals FFL1-FFL5 over the whole range of the forward feeder link spectrum (for example, having a bandwidth of 250 MHz).

Each of the forward feeder link signals FFL1-FFL5 may thus include a plurality of feeder signals (for respective antenna feed elements of the forward service link antenna 601) staggered and substantially non-overlapping over the forward feeder link spectrum. Moreover, different sets of forward link band-pass filters FBP1(1)-FBP1(M), FBP2(1)-FBP2(M), FBP3(1)-FBP3(M), FBP4(1)-FBP4(M), and FBP5(1)-FBP5(M) and corresponding different sets of forward frequency translators FFT1(1)-FFT1(M), FFT2(1)-FFT2(M), FFT3(1)-FFT3(M), FFT4(1)-FFT4(M), and FFT5(1)-FFT5(M) may be provided for each of the forward feeder signals provided in each of the forward feeder link signals FFL1-FFL5. The forward band-pass filters FBP and forward frequency translators FFT may be adaptable after deployment of space-based component 101 to accommodate different numbers of forward feeder links and/or different numbers and bandwidths of forward signals provided over each forward feeder link.

Moreover, the forward feeder links 111a-e may be generated by the ground-based beam former 115 and transmitted from respective gateways 103a-e. More particularly, communications may be received at the ground based beam former 115 from one or more wire-line telephones and/or wireless radioterminals through the public switched telephone network 117; from one or more radioterminals through the same or a different space-based network; from one or more radioterminals through an ancillary or other terrestrial network; and/or from one or more computing devices through a data network such as the Internet and/or an Intranet. For example, these communications may be received at a forward service link beam former 1001 for transmission through the satellite communications network to one or more radioterminals 105.

The forward service link beam former 1001 may apply different complex weights to the data for transmission to generate an appropriately weighted set of forward service link antenna feed element signals FS(1)-FS(M) to be transmitted from the respective forward service link antenna feed elements TE(1)-TE(M) of the satellite forward service link antenna 601 over forward service links 109a-c. By applying the appropriate weights, the different communications can thus be directed to different coverage areas 107a-c.

Each of the forward service link antenna feed element signals FS(1)-FS(M) can be coupled to an appropriate one of the signal combining lines of the sets of signal combining lines SCL1(1)-SCL1(M), SCL2(1)-SCL2(M), SCL3(1)-SCL3(M), SCL4(1)-SCL4(M) and/or SCL5(1)-SCL5(M), and then combined and mapped into an appropriate one of the forward feeder links 111a-e using signal combiners SC1-SC5. In particular, each signal combiner SC1-SC5 may combine some or all of the forward signals FS(1)-FS(M) (for example using frequency translators and summers) so that a resulting forward feeder link signal includes a plurality of the forward service link antenna feed element signals staggered (and substantially non-overlapping) over the forward feeder link frequency spectrum. Each of the signal combiners SC1-SC5, for example, may be implemented with M frequency translators and a summer coupled to the respective signal combining lines using a structure of frequency translators and summers analogous to that illustrated in FIG. 3 and discussed in greater detail above. More particularly, the signal combiner SC1 may be implemented with a structure as illustrated in FIG. 3 including frequency translators FT1(1)-FT1(N) and summer S1 (with N made equal to M).

The forward service link beam forming signal separator 1003 may be configured to couple forward service link antenna feed element signals FS(1)-FS(M) to respective ones of the sets of signal combining lines SCL1(1)-SCL1(M), SCL2(1)-SCL2(M), SCL3(1)-SCL3(M), SCL4(1)-SCL4(M) and/or SCL5(1)-SCL5(M) according to a distribution of forward service link antenna feed element signals across the forward feeder links. If all forward service link antenna feed element signals FS(1)-FS(M) are provided over forward feeder link 111a, for example, the forward service link antenna feed element signals FS(1)-FS(M) may be coupled through the forward service link beam forming signal separator 1003 to signal combining lines SCL1(1)-SCL1(M) and signal combiner SC1 for transmission over forward feeder link 111a. If forward service link antenna feed element signals FS(1)-FS(M) are to be evenly distributed over the forward feeder links 111a-e, for example, a first fifth of forward service link antenna feed element signals may be coupled through the forward service link beam forming signal separator 1003 to a fifth of signal combining lines SCL1(1)-SCL1(M) and signal combiner SC1 for transmission over forward feeder link 111a; a second fifth of forward service link antenna feed element signals may be coupled through the forward service link beam forming signal separator 1003 to a fifth of signal combining lines SCL2(1)-SCL2(M) and signal combiner SC2 for transmission over forward feeder link 111b; a third fifth of forward service link antenna feed element signals may be coupled through the forward service link beam forming signal separator 1003 to a fifth of signal combining lines SCL3(1)-SCL3(M) and signal combiner SC3 for transmission over forward feeder link 111c; a fourth fifth of forward service link antenna feed element signals may be coupled through the forward service link beam forming signal separator 1003 to a fifth of signal combining lines SCL4(1)-SCL4(M) and signal combiner SC4 for transmission over forward feeder link 111d; and a last fifth of the forward service link antenna feed element signals may be coupled through the forward service link beam forming signal separator 1003 to a fifth of signal combining lines SCL5(1)-SCL5(M) and signal combiner SC5 for transmission over forward feeder link 111e. Accordingly, the forward service link antenna feed element signals FS(1)-FS(M) may be coupled selectively from the forward service link beam former 1001 through the forward service link beam forming signal separator 1003 to the signal combining lines SCL1(1)-SCL1(M), SCL1(1)-SCL1(M), SCL1(1)-SCL1(M), SCL1(1)-SCL1(M) and SCL1(1)-SCL1(M) and signal combiners SC1-SC5 for transmission over forward feeder links 111a-e.

The forward service link beam former 1001 may generate forward service link antenna feed element signals FS(1)-FS(M), for transmissions to radioterminals 105a-c from other communications devices. For example, the forward service link beam former 1001 may generate the forward service link antenna feed element signals based on communications from one or more wire-line telephones and/or radioterminals received through a public switched telephone network (PSTN) 117; from one or more other radioterminals received through the same or a different space-based network; from one or more other radioterminals received through an ancillary or other terrestrial network; and/or from one or more data and/or voice devices received through a packet data network such as the Internet and/or an Intranet.

Upon initial deployment of the communications system, for example, use of all forward service link frequencies allocated to the system may not be required. In a system with 120 forward service link antenna feed elements with 10 MHz of spectrum allocated for forward service link transmissions from forward service link antenna 601 and with 250 MHz allocated for forward feeder link transmissions to receivers R1-R5, 2 MHz or less of spectrum may suffice for the forward service links on initial deployment. Accordingly, all 120 forward service link antenna feed element signals FS(1)-FS(120) may be accommodated over forward feeder link signal FFL1 received over the forward feeder link 111a, and the forward band-pass filters FBP1(1)-FBP1(120) may be configured to pass at least respective 2 MHz segments of the forward feeder link signal FFL1 to thereby separate each of the 120 forward service link antenna feed element signals FS(1)-FS(120) included in forward feeder link 111a. Moreover, the forward frequency translators FFT1(1)-FFT1(120) may be configured to translate, and bring in substantial frequency congruency, the forward service link antenna feed element signals FS(1)-FS(120), provided by forward feeder link 111*a*, from the forward feeder link band of frequencies to the system's authorized forward service link band of frequencies.

More particularly, $f_0$ and $\Delta f$ may be configured so that the output of each forward band-pass filter FBP1(1)-FBP1(120) is translated to substantially the same forward service link frequency spectrum. Accordingly, a different forward service link antenna feed element signal FS(1)-FS(120), over a substantially common frequency interval, may be provided to the forward service link antenna feed element signal selector 603 at each of the forward signal lines FSL1(1)-FSL1(120). The forward service link antenna feed element signal selector 603 may thus be configured to couple the forward service link antenna feed element signals FS(1)-FS(120) from the forward service link signal lines FSL1(1)-FSL1(120) to respective forward service link antenna elements TE(1)-TE(120) of the forward service link antenna 601. According to some embodiments of the present invention, a pass-band bandwidth of the forward band-pass filters FBP may be approximately equal to $\Delta f$, and may be approximately equal to or less than (the allocated forward feeder link spectrum bandwidth)/M when all forward service link antenna feed element signals are provided over a single forward feeder link. According to other embodiments, the pass-band bandwidth of the forward band-pass filters FBP may be equal to or approximately equal to the system's allocated forward service link bandwidth (i.e., 10 MHz).

At or near full system capacity, forward service link transmissions may use all, or nearly all, of the forward service link spectrum allocated to the system. For example, 10 MHz of forward service link spectrum may be allocated to the system, and 250 MHz of forward feeder link spectrum. As such, all forward service link antenna feed element signals may not be accommodated by one forward feeder link which may be constrained not to exceed 250 MHz. Accordingly, the M forward service link antenna feed element signals may be transported to the space-based component 101 using two or more forward feeder links that are configured to spatially reuse the system's authorized forward feeder link spectrum. Thus, in accordance with one embodiment, forward service link antenna feed element signals FS(1)-FS(24) may be provided over forward feeder link signal FFL1, forward service link antenna feed element signals FS(25)-FS(48) may be provided over forward feeder link signal FFL2, forward service link antenna feed element signals FS(49)-FS(72) may be provided over forward feeder link signal FFL3, forward service link antenna feed element signals FS(73)-FS(96) may be provided over forward feeder link signal FFL4, and forward service link antenna feed element signals FS(97)-FS(120) may be provided over forward feeder link signal FFL5. The forward band-pass filters FBP1(1)-FBP1(24), FBP2(1)-FBP2(24), FBP3(1)-FBP3(24), FBP4(1)-FBP4(24), and FBP5(1)-FBP5(24) may be configured to pass respective 10 MHz segments of the respective forward feeder link signals FFL1-FFL5 to thereby separate each of the 24 forward service link antenna feed element signals from each of the forward feeder link signals FFL1-FFL5. Moreover, the forward frequency translators FFT1(1)-FFT1(24), FFT2(1)-FFT2(24), FFT3(1)-FFT3(24), FFT4(1)-FFT4(24), and FFT5(1)-FFT5(24) may be configured to translate and bring in substantial frequency congruency the forward service link antenna feed element signals FS(1)-FS(120) over the system's allocated forward service link frequency spectrum.

More particularly, $f_0$ and $\Delta f$ may be configured so that the output of each forward band-pass filter of FBP1(1)-FBP1(24), FBP2(1)-FBP2(24), FBP3(1)-FBP3(24), FBP4(1)-FBP4(24) and FBP5(1)-FBP5(24) is translated to substantially the same forward service link frequency spectrum. Accordingly, a different forward service link antenna feed element signal FS(1)-FS(120), over a substantially common frequency interval, may be provided to the forward service link antenna feed element signal selector 603 at each of the forward signal lines FSL1(1)-FSL1(24), FSL2(1)-FSL2(24), FSL3(1)-FSL3(24), FSL4(1)-FSL4(24), and FSL5(1)-FSL5(24). The forward service link antenna feed element signal selector 603 may thus be configured to couple the forward service link antenna feed element signals FS(1)-FS(120) from the forward signal lines FSL1(1)-FSL1(24), FSL2(1)-FSL2(24), FSL3(1)-FSL3(24), FSL4(1)-FSL4(24) and FSL5(1)-FSL5(24) to the forward service link antenna 601. According to some embodiments of the present invention, a pass-band bandwidth of each of the forward band-pass filters FBP may be approximately equal to $\Delta f$ and may be approximately equal to or less than 5*(the allocated forward feeder link spectrum bandwidth)/M when the forward service link antenna feed element signals are evenly distributed, or approximately evenly distributed, over five forward feeder links.

The forward service link antenna feed element signal selector 603 may be configured to select the forward service link antenna feed element signals FS(1)-FS(M) from particular ones of the forward signal lines FSL1(1)-FSL1(M), FSL2(1)-FSL2(M), FSL3(1)-FSL3(M), FSL4(1)-FSL4(M) and FSL5(1)-FSL5(M) for transmission over forward service links 109*a*-109*c*. Forward service link antenna feed element signals FS(1)-FS(A) may be generated at some or all of forward signal lines FSL1(1)-FSL1(M) from the forward feeder link signal FFL1 using some or all of forward band-pass filters FBP1(1)-FBP1(M) and forward frequency translators FFT1(1)-FFT1(M); forward service link antenna feed element signals FS(A+1)-FS(B) may be generated at some or all of forward signal lines FSL2(1)-FSL2(M) from the forward feeder link signal FFL2 using some or all of forward band-pass filters FBP2(1)-FBP2(M) and forward frequency translators FFT2(1)-FFT2(M); forward service link antenna feed element signals FS(B+1)-FS(C) may be generated at some or all of forward signal lines of the set of signal lines FSL3(1)-FSL3(M) from the forward feeder link signal FFL3 using some or all of forward band-pass filters FBP3(1)-FBP3(M) and forward frequency translators FFT3(1)-FFT3(M); forward service link antenna feed element signals FS(C+1)-FS(D) may be generated at some or all of forward signal lines FSL4(1)-FSL4(M) from the forward feeder link signal FFL4 using some or all of forward band-pass filters of the set of FBP4(1)-FBP4(M) and forward frequency translators FFT4(1)-FFT4(M); and forward service link antenna feed element signals FS(D+1)-FS(E) may be generated at some or all of forward signal lines FSL5(1)-FSL5(M) from the forward feeder link signal FFL5 using some or all of forward band-pass filters FBP5(1)-FBP5(M) and forward frequency translators FFT5(1)-FFT5(M). In some embodiments, each one of A, B, C, D and E is equal to, or approximately equal to, M/5. More particularly, up to M forward band-pass filters FBP, up to M forward signal lines FSL, and up to M forward link frequency translators FFT may be provided, in some embodiments, between each of the forward link receivers R1-R5 and the forward service link antenna feed element signal selector 603 so that the forward service link antenna feed element signals of the set FS(1)-FS(M) can be adaptively coupled by the forward service link antenna feed element signal selector 603 to forward service link antenna feed elements TE(1)-TE(120) of the forward service link antenna 601 depending on a utilization of the system. In other embodiments, the number of forward band-pass filters FBP, the number of forward signal lines FSL and the number of forward link frequency translators FFT that may be provided between each of the forward link receivers R1-R5 and the forward service link antenna feed element signal selector 603 so that the forward service link antenna feed element signals FS(1)-FS(M) can be adaptively coupled by the forward service link antenna feed element signal selector 603 to forward service link antenna feed elements TE(1)-TE(120) of the forward service link antenna 601, may be different for different paths associated with different receivers R1-R5. Accordingly, the number of forward band-pass filters FBP, the number of forward signal lines FSL and the number of forward link frequency translators FFT that may be provided between each of the forward link receivers R1-R5 and the forward service link antenna feed element signal selector 603 may be M (or approximately M), M/2 (or approximately M/2), M/3 (or approximately M/3), M/4 (or approximately M/4) and M/5 (or approximately M/5), associated with receivers R1, R2, R3, R4 and R5, respectively.

When initially deployed, for example, a sufficiently small portion of an available forward service link spectrum may be used such that all M forward service link antenna feed element signals FS(1)-FS(M) can be received over a single forward feeder link 111a. Accordingly, the forward service link antenna feed element signal selector 603 may couple all of the forward service link antenna feed element signals FS(1)-FS(M) from the forward signal lines FSL1(1)-FSL1(M) to the forward service link antenna 601, with no forward signals being coupled from any of the other forward signal lines FSL2(1)-FSL2(M), FSL3(1)-FSL3(M), FSL4(1)-FSL4(M) or FSL5(1)-FSL5(M). The forward link band-pass filters FBP1(1)-FBP1(M) may be configured to pass respective forward service link antenna feed element signals FS(1)-FS(M) distributed over the forward feeder link spectrum, and each of the forward frequency translators in the set FT1(1)-FT1(M) may be configured with $f_0$ and $\Delta f$ selected to translate the forward service link antenna feed element signals from being staggered and substantially non-overlapping within the forward feeder link frequency spectrum to being substantially overlapping in the forward service link frequency spectrum. Here, $\Delta f$ may be calculated as approximately (forward feeder link spectrum bandwidth)/M or less. Moreover, the pass-band bandwidth of each of the forward band-pass filters FBP1(1)-FBP1(M) may be approximately $\Delta f$ more than $\Delta f$ or less than $\Delta f$. At the beam former 115 and/or at the forward service link beam former 1001, all M forward service link antenna feed element signals FS(1)-FS(M) can thus be coupled through the forward service link beam forming signal separator 1003 to the signal coupling lines SCL1(1)-SCL1(M) for transmission over forward feeder link 111a.

With increasing spectrum usage, two forward feeder links 111a and 111b may be needed to transmit all of the forward service link antenna feed element signals in the set FS(1)-FS(M) from geographically separated gateways 103a and 103b. The forward service link antenna feed element signal selector 603 may couple a first half, or approximately a first half, of the forward service link antenna feed element signals from the set FS(1)-FS(M) from a half, or approximately a half, of the forward signal lines FSL1(1)-FSL1(M) to the forward service link antenna 601. In addition, the forward service link antenna feed element signal selector 603 may couple a second half, or approximately a second half, of the forward service link antenna feed element signals FS(1)-FS(M) from a half, or approximately a half, of the forward signal lines set FSL2(1)-FSL2(M) to the forward service link antenna 601. In such a configuration, no forward service link antenna feed element signals are coupled from other forward signal lines FSL3(1)-FSL3(M), FSL4(1)-FSL4(M) or FSL5(1)-FSL5(M).

At least some (i.e., half, or approximately half) of the forward link band-pass filters FBP1(1)-FBP1(M) may be configured to pass respective forward service link antenna feed element signals FS(1)-FS(M) distributed over the forward feeder link spectrum of forward feeder link signal FFL1, and at least some (i.e., half, or approximately half) of the forward link band-pass filters FBP2(1)-FBP2(M) may be configured to pass respective forward service link antenna feed element signals of the set FS(1)-FS(M) distributed over the forward feeder link spectrum of forward feeder link signal FFL2. Moreover, at least some (i.e., half, or approximately half) of the forward frequency translators FT1(1)-FT1(M) and FT2(1)-FT2(M) may be configured with $f_0$ and $\Delta f$ selected to translate the forward service link antenna feed element signals from being staggered (in substantially non-overlapping manner) within the forward feeder link frequency spectrum of forward feeder link signals FFL1 and FFL2 to being substantially overlapping (i.e., substantially frequency congruent) in the forward service link frequency spectrum. Here, $\Delta f$ may be calculated as approximately 2*(forward feeder link spectrum bandwidth)/M or less. Moreover, the pass-band bandwidth of the at least some of the forward band-pass filters FBP1(1)-FBP1(M) and FBP2(1)-FBP2(M) may be approximately $\Delta f$, more than $\Delta f$ or less than $\Delta f$. A capacity measure of the system can thus be doubled by providing two forward feeder links 111a-b transmitted from two geographically separated gateways 103a-b.

At the beam former 115 and/or at forward service link beam former 1001, a first half M/2, or approximately a first half, of the forward service link antenna feed element signals FS(1)-FS(M) can be coupled through the forward service link beam forming signal separator 1003 to a half, or approximately a half, of the signal coupling lines SCL1(1)-SCL1(M) for transmission over forward feeder link 111a. A second half M/2, or approximately a second half, of the forward signals FS(1)-FS(M) can be coupled through the forward service link beam forming signal separator 1003 to a half, or approximately a half, of the signal coupling lines SCL2(1)-SCL2(M) for transmission over forward feeder link 111b.

With further increases in spectrum usage, three forward feeder links 111a-c may be needed to transmit all of the forward service link antenna feed element signals in the set FS(1)-FS(M) from geographically separated gateways 103a-c. The forward service link antenna feed element signal selector 603 may couple a first third, or approximately a first third, of the forward service link antenna feed element signals FS(1)-FS(M) from a one third, or approximately a one third, of the forward signal lines FSL1(1)-FSL1(M) to the forward service link antenna 601. In addition, the forward service link antenna feed element signal selector 603 may couple a second third, or approximately a second third, of the forward service link antenna feed element signals FS(1)-FS(M) from a one third, or approximately a one third, of the forward signal lines FSL2(1)-FSL2(M) to the forward service link antenna 601. The forward service link antenna feed element signal selector 603 may also couple a final third, or approximately a final third, of the forward service link antenna feed element signals FS(1)-FS(M) from a one third, or approximately a one third, of the forward signal lines FSL3(1)-FSL3(M) to the forward service link antenna 601. In such a configuration, no forward service link antenna feed element signals are coupled from any other forward signal lines FSL4(1)-FSL4(M) or FSL5(1)-FSL5(M).

At least some (one third, or approximately one third) of the forward link band-pass filters FBP1(1)-FBP1(M) may be configured to pass respective forward service link antenna feed element signals FS(1)-FS(M) distributed over the forward feeder link spectrum of forward feeder link signal FFL1. At least some (one third, or approximately one third) of the forward link band-pass filters FBP2(1)-FBP2(M) may be configured to pass respective forward service link antenna feed element signals FS(1)-FS(M) distributed over the forward feeder link spectrum of forward feeder link signal FFL2. At least some (one third, or approximately one third) of the forward link band-pass filters FBP3(1)-FBP3(M) may be configured to pass respective forward signals FS(1)-FS(M) distributed over the forward feeder link spectrum of forward feeder link signal FFL3. Moreover, at least some (one third, or approximately one third) of the forward frequency translators FT1(1)-FT1(M), FT2(1)-FT2(M) and FT3(1)-FT3(M) may be configured with $f_0$ and $\Delta f$ selected to translate the forward service link antenna feed element signals from being staggered (substantially non-overlapping in frequency) within the forward feeder link frequency spectrum of forward feeder link signals FFL1-FFL3 to being substantially overlapping (substantially frequency congruent) in the forward service link frequency spectrum. Here, $\Delta f$ may be calculated as approximately 3*(forward feeder link spectrum bandwidth)/M or less. Moreover, the pass-band bandwidth of each of the at least some (one third, or approximately one third) of the forward band-pass filters FBP1(1)-FBP1(M), FBP2(1)-FBP1(M) and FBP3(1)-FBP3(M) may be approximately $\Delta f$, more than $\Delta f$ or less than $\Delta f$. A capacity measure of the system can thus be tripled by providing three forward feeder links 111*a-c* transmitted from three geographically separated gateways 103*a-c*.

At the beam former 115 and/or forward service link beam former 1001, a first third M/3, or approximately a first third, of the forward service link antenna feed element signals FS(1)-FS(M) can be coupled through the forward service link beam forming signal separator 1003 to one third, or approximately one third, of the signal coupling lines SCL1(1)-SCL1(M) for transmission over forward feeder link 111*a*. A second third M/3, or approximately a second third, of the forward service link antenna feed element signals FS(1)-FS(M) can be coupled through the forward service link beam forming signal separator 1003 to one third, or approximately one third, of the signal coupling lines SCL2(1)-SCL2(M) for transmission over forward feeder link 111*b*. A final third M/3, or approximately a final third, of the forward service link antenna feed element signals FS(1)-FS(M) can be coupled through the forward service link beam forming signal separator 1003 to one third, or approximately one third, of the signal coupling lines SCL3(1)-SCL3(M) for transmission over forward feeder link 111*c*.

With still further increases in spectrum usage, four forward feeder links 111*a-d* may be needed to transmit all of the forward service link antenna feed element signals FS(1)=FS(M) from geographically separated gateways 103*a-d*. The forward service link antenna feed element signal selector 603 may couple a first quarter, or approximately a first quarter, of the forward service link antenna feed element signals FS(1)-FS(M) from a quarter, or approximately a quarter, of the forward signal lines FSL1(1)-FSL1(M) to the forward service link antenna 601. In addition, the forward service link antenna feed element signal selector 603 may couple a second quarter, or approximately a second quarter, of the forward service link antenna feed element signals FS(1)-FS(M) from a quarter, or approximately a quarter, of the forward signal lines FSL2(1)-FSL2(M) to the forward service link antenna 601. The forward service link antenna feed element signal selector 603 may also couple a third quarter, or approximately a third quarter, of the forward service link antenna feed element signals FS(1)-FS(M) from a quarter, or approximately a quarter, of the forward signal lines FSL3(1)-FSL3(M) to the forward service link antenna 601. The forward service link antenna feed element signal selector 603 may further couple a final quarter, or approximately a final quarter, of the forward service link antenna feed element signals FS(1)-FS(M) from a quarter, or approximately a quarter, of the forward signal lines FSL4(1)-FSL4(M) to the forward service link antenna 601. In such a configuration, no forward service link antenna feed element signals are coupled from forward signal lines FSL5(1)-FSL5(M).

M/4 or approximately M/4 of forward link band-pass filters FBP1(1)-FBP1(M) may be configured to substantially pass respective forward service link antenna feed element signals FS(1)-FS(M) distributed over the forward feeder link spectrum of forward feeder link signal FFL1. M/4 or approximately M/4 of the forward link band-pass filters FBP2(1)-FBP2(M) may be configured to substantially pass respective forward service link antenna feed element signals FS(1)-FS(M) distributed over the forward feeder link spectrum of forward feeder link signal FFL2. M/4 or approximately M/4 of the forward link band-pass filters FBP3(1)-FBP3(M) may be configured to substantially pass respective forward service link antenna feed element signals of the set FS(1)-FS(M) distributed over the forward feeder link spectrum of forward feeder link signal FFL3. M/4 or approximately M/4 of the forward link band-pass filters of the set FBP4(1)-FBP4(M) may be configured to substantially pass a respective M/4, or approximately M/4, of forward signals FS(1)-FS(M) distributed over the forward feeder link spectrum of forward feeder link signal FFL4.

Moreover, each of the forward frequency translators of the sets FT1(1)-FT1(M), FT2(1)-FT2(M), FT3(1)-FT3(M) and FT4(1)-FT4(M) that are used may be configured with $f_0$ and $\Delta f$ selected to translate the forward signals from being staggered and are substantially non-overlapping within the forward feeder link frequency spectrum of forward feeder link signals FFL1-FFL4 to being substantially overlapping (substantially frequency congruent) in the forward service link frequency spectrum. Here, $\Delta f$ may be calculated as approximately 4*(forward feeder link spectrum bandwidth)/M or less. Moreover, the pass-band bandwidth of each of the forward band-pass filters of the sets FBP1(1)-FBP1(M), FBP2(1)-FBP2(M), FBP3(1)-FBP3(M) and FBP4(1)-FBP4(M) that are used may be approximately $\Delta f$, greater than $\Delta f$ or less than $\Delta f$. A capacity of the system can thus be quadrupled by providing four forward feeder links 111*a-d* transmitted from geographically separated gateways 103*a-d*.

At the beam former 115 and/or forward service link beam former 1001, a first quarter M/4, or approximately a first quarter, of the forward signals FS(1)-FS(M) can be coupled through the forward service link beam forming signal separator 1003 to the signal coupling lines SCL1(1)-SCL1(M) for transmission over forward feeder link 111*a*. A second quarter M/4, or approximately a second quarter, of the forward signals of the set FS(1)-FS(M) can be coupled through the forward service link beam forming signal separator 1003 to the signal coupling lines SCL2(1)-SCL2(M) for transmission over forward feeder link 111*b*. A third quarter M/4, or approximately a third quarter, of the forward signals FS(1)-FS(M) can be coupled through the forward service link beam forming signal separator 1003 to the signal coupling lines SCL3(1)-SCL3(M) for transmission over forward feeder link 111*c*. A final quarter M/4, or approximately a final quarter, of the forward signals FS(1)-FS(M) can be coupled through the forward service link beam forming signal separator 1003 to the signal coupling lines SCL4(1)-SCL4(M) for transmission over forward feeder link 111d.

With yet further increases in spectrum usage and/or system subscriptions, five forward feeder links 111a-e may be needed to transmit all of the forward signals in the set FS(1)-FS(M) from geographically separated gateways 103a-e. The forward service link antenna feed element signal selector 603 may couple a first fifth, or approximately a first fifth, of the forward signals FS(1)-FS(M) from the forward signal lines of the set FSL1(1)-FSL1(M) to the forward service link antenna 601. In addition, the forward service link antenna feed element signal selector 603 may couple a second fifth, or approximately a second fifth, of the forward signals FS(1)-FS(M) from the forward signal lines FSL2(1)-FSL2(M) to the forward service link antenna 601. The forward service link antenna feed element signal selector 603 may also couple a third fifth, or approximately a third fifth, of the forward signals FS(1)-FS(M) from the forward signal lines FSL3(1)-FSL3(M) to the forward service link antenna 601. The forward service link antenna feed element signal selector 603 may further couple another fifth, or approximately another fifth, of the forward signals FS(1)-FS(M) from the forward signal lines FSL4(1)-FSL4(M) to the forward service link antenna 601. Moreover, the forward service link antenna feed element signal selector 603 may couple a final fifth, or approximately a final fifth, of the forward signals FS(1)-FS(M) from the forward signal lines FSL5(1)-FSL5(M) to the forward service link antenna 601.

The forward link band-pass filters FBP1(1)-FBP1(M) that are used may be configured to pass respective forward signals FS(1)-FS(M) distributed over the forward feeder link spectrum of forward feeder link signal FFL1. The forward link band-pass filters FBP2(1)-FBP2(M) that are used may be configured to pass respective forward signals FS(1)-FS(M) distributed over the forward feeder link spectrum of forward feeder link signal FFL2. The forward link band-pass filters FBP3(1)-FBP3(M) that are used may be configured to pass respective forward signals FS(1)-FS(M) distributed over the forward feeder link spectrum of forward feeder link signal FFL3. The forward link band-pass filters FBP4(1)-FBP4(M) that are used may be configured to pass respective forward signals FS(1)-FS(M) distributed over the forward feeder link spectrum of forward feeder link signal FFL4. The forward link band-pass filters FBP5(1)-FBP5(M) that are used may be configured to pass respective forward signals FS(1)-FS(M) distributed over the forward feeder link spectrum of forward feeder link signal FFL5.

Moreover, each of the forward frequency translators of the sets FT1(1)-FT1(M), FT2(1)-FT2(M), FT3(1)-FT3(M), FT4(1)-FT4(M) and FT5(1)-FT5(M) that are used may be configured with $f_o$ and $\Delta f$ selected to translate the forward signals from being staggered within the forward feeder link frequency spectrum of forward feeder link signals FFL1-FFL5 to being substantially overlapping in the forward service link frequency spectrum. Here, $\Delta f$ may be calculated as approximately 5*(forward feeder link spectrum bandwidth)/M or less. Moreover, the pass-band bandwidth of each of the forward band-pass filters FBP1(1)-FBP1(M), FBP2(1)-FBP2(M), FBP3(1)-FBP3(M), FBP4(1)-FBP4(M) and FBP5(1)-FBP5(M) that are used may be approximately $\Delta f$, less or more. A system capacity can thus be increased by a factor of five by providing five forward feeder links 111a-e transmitted from geographically separated gateways 103a-e.

At the beam former 115 and/or forward service link beam former 1001, a first fifth M/5, or approximately a first fifth, of the forward signals FS(1)-FS(M) can be coupled through the forward service link beam forming signal separator 1003 to the signal coupling lines SCL1(1)-SCL1(M) for transmission over forward feeder link 111a. A second fifth M/5, or approximately a second fifth, of the forward signals FS(1)-FS(M) can be coupled through the forward service link beam forming signal separator 1003 to the signal coupling lines SCL2(1)-SCL2(M) for transmission over forward feeder link 111b. A third fifth M/5, or approximately a third fifth, of the forward service link antenna feed element signals FS(1)-FS(M) can be coupled through the forward service link beam forming signal separator 1003 to the signal coupling lines SCL3(1)-SCL3(M) for transmission over forward feeder link 111c. Another fifth M/5, or approximately another fifth, of the forward signals FS(1)-FS(M) can be coupled through the forward service link beam forming signal separator 1003 to the signal coupling lines of the set SCL4(1)-SCL4(M) for transmission over forward feeder link 111d. A final fifth M/5, or approximately a final fifth, of the forward signals FS(1)-FS(M) can be coupled through the forward service link beam forming signal separator 1003 to the signal coupling lines SCL5(1)-SCL5(M) for transmission over forward feeder link 111e.

According to embodiments discussed above, M forward signal lines FSL, M forward band-pass filters FBP, and M forward link frequency translators FFT may be provided between each forward feeder link receiver R1-R5 and the forward service link antenna feed element signal selector 603 so that the forward service link antenna feed element signal selector 603 can adaptively couple forward signals FS(1)-FS(M) from forward signal lines FSL1(1)-FSL1(M), FSL2(1)-FSL2(M), FSL3(1)-FSL3(M), FSL4(1)-FSL4(M) and/or FSL5(1)-FSL5(M) to the forward service link antenna 601. For example, all M forward signal lines FSL1(1)-FSL(M), all M band-pass filters FBP1(1)-FBP1(M), and all M forward link frequency translators FFT1(1)-FFT1(M) between forward link receiver R1 and the forward service link antenna feed element signal selector 603 may be used when receiving all M forward signals over feeder link 111a (with none of the forward signal lines, forward band-pass filters, or forward frequency translators coupled to forward feeder link receivers R2-R5 being used). In contrast, one fifth of the forward signal lines FSL, one fifth of the forward band-pass filters FBP, and one fifth of the forward frequency translators FFT coupled to each of the forward feeder link receivers R1-R5 may, for example, be used when the forward signals (forward service link antenna feed element signals) are evenly distributed over the five forward feeder links 111a-e. Accordingly, in some embodiments of the invention, M1 forward service link signal lines FSL1(1)-FSL1(M1) and M1 forward service link frequency translators FFT1(1)-FFT1(M1) may be provided between the forward service link antenna feed element signal selector 603 and the first receiver R1, where M1 is equal to M, or approximately equal to M; M2 forward service link signal lines, denoted as FSL2(1)-FSL2(M2), and M2 forward service link frequency translators, denoted as FFT2(1)-FFT2(M2), may be provided between the forward service link antenna feed element signal selector 603 and the second receiver R2, where M2 is equal to M/2, or approximately equal to M/2; N3 forward service link signal lines and N3 forward service link frequency translators, FSL3(1)-SL3(M3) and FFT3(1)-FFT3(M3), respectively, may be provided between the forward service link antenna feed element signal selector 603 and the third receiver R3, where M3 is equal to M/3, or approximately equal to M/3; M4 forward service link signal lines FSL4(1)-FSL4(M4) and M4 forward service link frequency translators FFT4(1)-FFT4(M4) may be provided between the forward service link antenna feed element signal selector 603 and the fourth receiver R4, where M4 is equal to M/4, or approximately equal to M/4; and M5 forward service link signal lines and M5 forward service link frequency translators, denoted as FSL5(1)-FSL5(M5) and FFT5(1)-FFT5(M5), respectively, may be provided between the forward service link antenna feed element signal selector 603 and the fifth receiver R5, where M5 is equal to M/5, or approximately equal to M/5.

In some embodiments, some of the M, M/2, M/3, M/4 and M/5 (or approximately M, M/2, M/3, M/4 and M/5) sets of forward service link lines and frequency translators provided between the signal selector 603 and the respective receivers R1-R5, are utilized to a lesser extent as a service link spectrum utilization and/or ground facility (gateway) utilization of the system increases; other sets are utilized more. For example, when the system is utilizing five gateways the utilization of the M (or approximately M) forward service link lines and frequency translators provided between the signal selector 603 and receiver R1 is only one fifth (or approximately one fifth) of the utilization of the M (or approximately M) forward service link lines and frequency translators provided between the signal selector 603 and receiver R1 when, initially, the system is utilizing only one ground facility (gateway). In contrast to a final utilization of the M (or approximately M) forward service link lines and frequency translators provided between the signal selector 603 and receiver R1 reducing over time to one fifth (or approximately one fifth) of an initial utilization, a final utilization of forward service link lines and frequency translators provided between the signal selector 603 and receiver R5 increases from a minimum utilization of zero to a maximum utilization of M/5 (or approximately M/5) as the system increases a utilization of a number of ground facilities (gateways) from one to five.

While a plurality of separate receivers R1-5 are shown in FIG. 6 for purposes of illustration, the different feeder links 111*a-e* may be received using a same phased array antenna at the satellite over different spot beams from the geographically separated gateways 103*a-e* and/or the different feeder links may be received using different directional antennas at the satellite. Moreover, instead of a signal selector 603 and 5*M frequency translator and band-pass filter pairs, the same functionality may be provided using an adaptive switching circuit coupled between the receivers R1-5 and N band-pass filter and frequency translator pairs with the output of each band-pass filter and frequency translator pair being provided to a respective input FS(1)-FS(M) of the forward service link antenna 601. In such a configuration, inputs to the band-pass filter and frequency translator pairs may be adaptively switched to the receivers to provide the functionality discussed herein.

Embodiments in which the M forward service link antenna feed element signals are evenly distributed, approximately evenly distributed or un-evenly distributed over two or more forward feeder links, as described above, may require a centralized ground-based beam forming architecture (for return and/or forward service link beam forming) wherein a subset of the M forward service link antenna feed element signals that is transported via a forward feeder link of a ground facility (gateway) to a space-based component, such as a satellite, is routed to the ground facility (gateway) from another ground facility that includes a ground-based beam former, such as a forward service link beam former 1001 and/or beam former 115. Furthermore, it may be difficult, in some embodiments, to route different subsets of forward service link antenna feed element signals to different ground facilities (gateways) to be transported to a space-based component while maintaining, at the space-based component, the appropriate complex weights required to form forward service link beams (antenna patterns) by the plurality of forward link antenna feed elements of the space-based component antenna.

Accordingly, in other embodiments, a centralized ground-based beam forming architecture and the associated signal routing between two or more ground facilities (for the purpose of forming service link beams) and the technical challenges associated therewith may be avoided by configuring the forward service link beam former 1001 and/or the forward service link beam forming signal separator 1003 alternatively. In accordance with such an alternate configuration, the forward service link beam former 1001 and/or the forward service link beam forming signal separator 1003 may be operatively configured (at a centralized ground facility and/or at each one of a plurality of ground facilities (gateways)) to not provide substantially complete forward service link antenna feed element signals to signal combiners SC1-SC5 (with the possible exception of signal combiner SC1 during the period of time when service link spectrum utilization is small yielding relatively narrow-band forward service link antenna feed element signals and allowing the system to operate with only one forward feeder link and one ground facility (gateway)). Instead, the forward service link beam former 1001 and/or the forward service link beam forming signal separator 1003 is/are configured to provide an element of a forward service link antenna feed element signal at each one of an output thereof wherein the element of the forward service link antenna feed element signal includes a portion of a total frequency content of a respective forward service link antenna feed element signal. As such, the M forward service link signals that are provided to an $j^{th}$ signal combiner, SCj (=1, 2, . . . ), may be a complete set of forward service link antenna feed element signals over a predetermined forward service link frequency interval that is less than or equal to a bandwidth of a corresponding forward feeder link, 111*a-e*, divided by M. With each one of the forward feeder links 111*a-e* delivering to the space-based component a complete set, or substantially complete set, of the forward service link antenna feed element signals over a predetermined frequency interval, from a given ground facility (gateway) enables the ground facility (gateway) to form any desired forward service link beam, over the entire service footprint of the system, over the predetermined frequency interval without needing and/or requiring the use, at the space-based component, of any other forward service link antenna feed element signal(s) delivered to the space-based component by any other facility (gateway). Thus, a distributed ground-based service link beam forming architecture may be configured wherein each of a plurality of ground facilities (gateways) may exercise independent control in forming service link beams (forward and/or return) over an entire service footprint of a system over a limited predetermined portion of the service link spectrum (return and/or forward).

Instead of a signal separator 1003 used with M frequency translator and band-pass filter pairs at each of the signal combiners SC1-5, the same functionality may be provided using M frequency translator and band-pass filter pairs coupled to respective outputs FS(1)-FS(N) with an adaptive switching circuit coupled between the outputs of the M frequency translator and band-pass filter pairs and the feeder links 111*a-e* to N frequency translator and band-pass filter pairs, with each of the N frequency translator and band-pass filter pairs feeding a respective input of the beam former 903. In such a configuration, outputs of the frequency translator and band-pass filter pairs may be adaptively switched to the feeder links 111*a-e* to provide the functionality discussed herein.

While five feeder links 111a-b are shown by way of example, it will be understood, that any number of feeder links (greater than or equal to one) with corresponding forward feeder link receivers, forward band-pass filters, and forward frequency translators may be provided according to embodiments of the present invention. Moreover, even distribution of forward signals across feeder links being used is not required. In addition, couplings of forward signals FS to the forward service link antenna 601 through the forward service link antenna feed element signal selector 603, the value of Δf and a pass-band bandwidth of filters FBP may be changed based on commands transmitted to the space-based component 101 from a ground controller. Accordingly, utilization of available spectrum bandwidths can be adapted after deployment of the space-based component responsive, for example, to increasing system usage and/or availability of additional ground-based gateways 103. A value of $f_0$ may remain unchanged (even as a value of Δf is changed) provided that the allocations of forward service link frequency spectrum and forward feeder link frequency spectrum remain unchanged. In other embodiments, however, $f_0$ may be changed, for example if a lowest used frequency of the return service link frequency spectrum changes. Moreover, forward and return portions of feeder links 111a-e need not be identical. In other words, forward and return portions of feeder links 111a-e may be asymmetric to support asymmetric communications such as, for example, Internet browsing where a return link may require lesser bandwidth than a forward link.

Embodiments of FIG. 6 will now be discussed, by way of example, with respect to particular examples of frequency spectrum allocations and usage. According to particular embodiments, the forward service link antenna 601 may include 120 transmit antenna elements TE(1)-TE(120) so that M=120, 10 MHz of frequency spectrum may be allocated for forward service link transmissions from antenna 601 of satellite 101 to radioterminals 105, and 250 MHz of frequency spectrum may be allocated for forward feeder link transmissions from gateways 103 to satellite 101. FIGS. 7a-b and 8a-d illustrate respective frequency translations.

When such a communications system is first deployed, a full capacity thereof may not be needed. Of the 10 MHz of frequency spectrum allocated for forward service link transmissions, for example, 1 MHz, or approximately 1 MHz, of frequency spectrum may be sufficient to satisfy initial demand. Accordingly, transmissions from forward service link antenna 601 may be limited to a 1 MHz, or approximately 1 MHz, band of frequency spectrum. Moreover, the forward service link antenna feed element signal selector 603 may couple all of the forward signals FS(1)-FS(120) from the forward feeder link signal FFL1, the forward band-pass filters FBP1(1)-FBP1(120), the forward frequency translators FFT1(1)-FFT1(120), and forward signal lines FSL1(1)-FSL1(120) to the forward service link antenna 601. Accordingly, the forward band-pass filter sets and the forward frequency translator sets, FBP2(1)-FBP2(120), FBP3(1)-FBP3(120), FBP4(1)-FBP4(120) and FBP5(1)-FBP5(120), and FFT2(1)-FFT2(120), FFT3(1)-FFT3(120), FFT4(1)-FFT4(120) and FFT5(1)-FFT5(120), respectively, may be idle. In this situation, $f_0$ may be a difference between a lowest frequency of the spectrum allocated for forward service links and a lowest frequency of the spectrum allocated for forward feeder links, and Δf may be approximately equal to (or less than) a bandwidth of the frequency spectrum allocated for forward feeder links divided by a number of forward signals. More particularly, Δf may be approximately equal to (or less than) 2 MHz (i.e. 250 MHz/120=2.08 MHz). While a Δf of 2 MHz is used for purposes of explanation, Δf can be as low as 1 MHz, or approximately 1 MHz, (the bandwidth of frequency spectrum used to transmit forward service link communications) or as high as 2.08 MHz with the parameters set forth above.

Figure 7A:
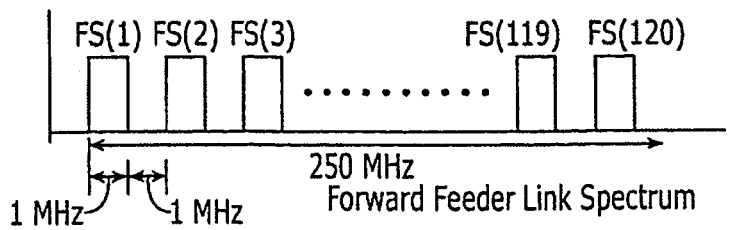
FIGS. 7*a-b* and 8*a-d* are graphs illustrating forward signal frequency translation according to embodiments of the present invention.
Figure 7B:
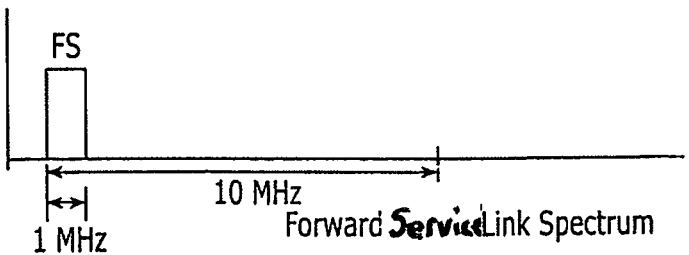

The forward link frequency translators FFT1(1)-FFT1(120) may thus translate (or shift) each of the forward signals FS(1)-FS(120) in frequency so that each forward signal FS(1)-FS(120) occupies a substantially same portion of the forward service link spectrum. As shown in FIG. 7a, each of the forward signals FS(1)-FS(120) may be provided in substantially non-overlapping portions of the forward feeder link frequency spectrum before frequency translation with 2 MHz separation therebetween. The forward band-pass filters FBP1(1)-FBP1(120) and the set of forward frequency translators FFT1(1)-FFT1(120) can then separate and translate frequencies of the forward signals FS(1)-FS(120) so that each forward signal FS(1)-FS(120) is provided on a respective forward signal line FSL1(1)-FSL1(120). As shown in FIG. 7b, each of the forward signals FS(1)-FS(120) for respective elements of the forward service link antenna 601 may thus occupy a substantially same 1 MHz portion of the forward service link frequency spectrum after filtering and frequency translation for transmission over forward service links 109a-c. In such a configuration: Δf may be 2 MHz; center frequencies of the band-pass filters FBP1(1)-FBP1(120) may be staggered by approximately 2 MHz; and a pass-band bandwidth of each band-pass filter may be between 1 MHz and 2 MHz, or approximately between 1 MHz and 2 MHz. In some embodiments, a pass-band bandwidth of each band-pass filter may be 10 MHz, or approximately 10 MHz.

In the example of FIGS. 7a and 7b, additional capacity may be provided by reducing spacing between adjacent forward signals in the forward feeder link spectrum. More particularly, up to 2 MHz of forward service link frequency spectrum can be used with a Δf of 2 MHz before additional feeder links may be required. Accordingly, an expense and/or complexity of multiple ground-based gateways can be avoided when such a communications system is initially deployed.

As a usage of the communications system increases, additional forward service link capacity may be needed. For example, 5 MHz of the frequency spectrum allocated for forward service link transmissions may be needed to satisfy demand. Accordingly, transmissions from forward service link antenna 601 to radioterminals 105 may be allowed over a 5 MHz frequency spectrum. Moreover, the forward service link antenna feed element signal selector 603 may couple the forward signals FS(1)-FS(40) from the forward feeder link signal FFL1, the forward band-pass filters FBP1(1)-FBP1(40), the forward frequency translators FFT1(1)-FFT1(40), and forward signal lines of the set FSL1(1)-FSL1(40) to the forward service link antenna 601. The forward service link antenna feed element signal selector 603 may also couple the forward signals of the set FS(41)-FS(80) from the forward feeder link signal FFL2, the forward band-pass filters FBP2(1)-FBP2(40), the forward frequency translators FFT2(1)-FFT2(40), and forward signal lines FSL2(1)-FSL2(40) to the forward service link antenna 601. In addition, the forward service link antenna feed element signal selector 603 may couple the forward signals FS(81)-FS(120) from the forward feeder link signal FFL3, the forward band-pass filters FBP3(1)-FBP3(40), the forward frequency translators FFT3(1)-FFT3(40), and forward signal lines FSL3(1)-FSL3(40) to the forward service link antenna 601. Accordingly, forward band-pass filters FBP4(1)-FBP4(120) and FBP5(1)-FBP5(120), and forward frequency translators FFT4(1)-FFT4(120) and FFT5(1)-FFT5(120) may be idle.

As before, $f_0$ may be a difference between a lowest frequency of the spectrum allocated for forward service links and a lowest frequency of the spectrum allocated for forward feeder links, and Δf may be approximately equal to (or less than) a bandwidth of the frequency spectrum allocated for forward feeder links divided by a number of forward signals transmitted over each forward feeder link being used (i.e. 40). More particularly, Δf may be approximately equal to (or less than) 6.25 MHz (i.e. 250 MHz/40=6.25 MHz). While a Δf of 6.25 MHz is used for purposes of explanation, Δf can be as low as 5 MHz (the bandwidth of frequency spectrum used for forward service link transmissions) or as high as 6.25 MHz with the parameters set forth above.

Figure 8A:
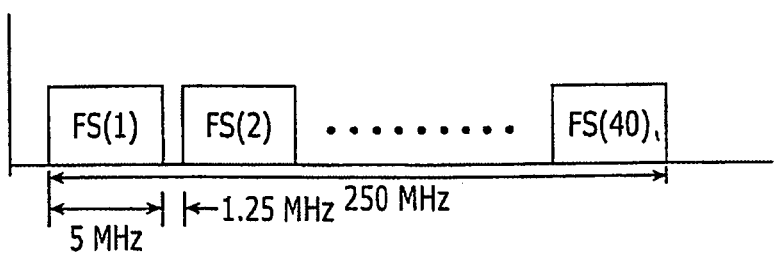
Figure 8B:
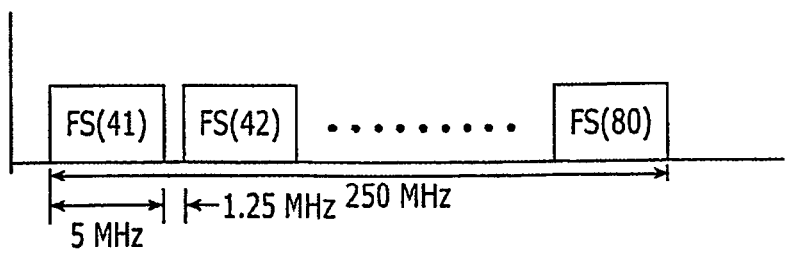
Figure 8C:
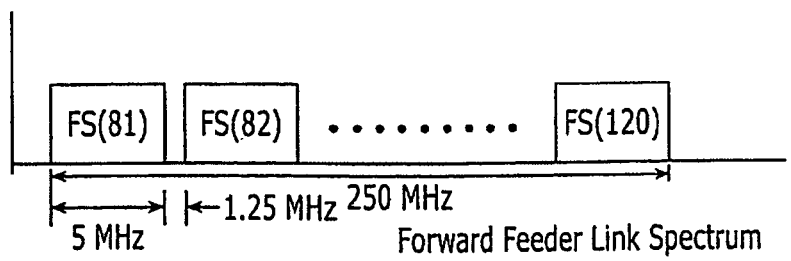

As shown in FIGS. 8*a-c*, each of the groups of forward signals FS(1)-FS(40), FS(41)-FS(80), and FS(81)-FS(120) may be provided in substantially non-overlapping portions of the forward feeder link frequency spectrum of respective forward feeder link signals FFL1-FFL3 before frequency translation with 6.25 MHz separation therebetween. The forward band-pass filters FBP1(1)-FBP1(40) and the forward frequency translators FFT1(1)-FFT1(40) can then separate and translate frequencies of the forward signals FS(1)-FS(40) so that each forward signal FS(1)-FS(40) is provided on a respective forward signal line FSL1(1)-FSL1(40). The forward band-pass filters FBP2(1)-FBP2(40) and the forward frequency translators FFT2(1)-FFT2(40) can separate and translate frequencies of the forward signals FS(41)-FS(80) so that each forward signal FS(41)-FS(80) is provided on a respective forward signal line of a set FSL2(1)-FSL2(40). The forward band-pass filters FBP3(1)-FBP3(40) and the forward frequency translators FFT3(1)-FFT3(40) can separate and translate frequencies of the forward signals FS(81)-FS(120) so that each forward signal FS(81)-FS(120) is provided on a respective forward signal line FSL3(1)-FSL3(40).

Figure 8D:
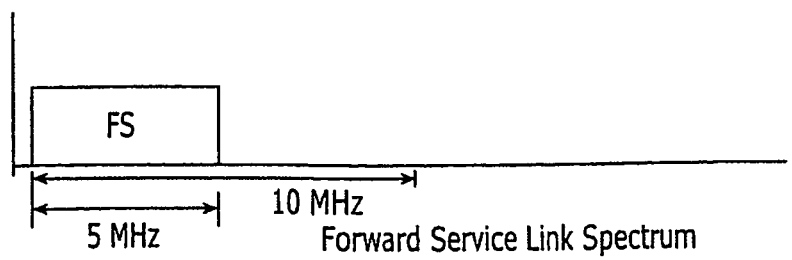

As shown in FIG. 8*d*, each of the forward signals FS(1)-FS(120) for respective elements of the forward service link antenna 601 may thus occupy a substantially same 5 MHz portion of the forward service link frequency spectrum after filtering and frequency translation for transmission over forward service links 109*a-c*. In such a configuration Δf may be 6.25 MHz, or approximately 6.25 MHz; center frequencies of the band-pass filters within each of the groups of filters FBP1(1)-FBP1(40), FBP2(1)-FBP2(40) and FBP3(1)-FBP3(40) may be staggered by 6.25 MHz, or approximately 6.25 MHz; and a pass-band bandwidth of each band-pass filter may be between 5 MHz and 6.25 MHz, or approximately between 5 MHz and 6.25 MHz.

In the example of FIGS. 8*a-d*, additional capacity may be provided by reducing spacing between adjacent forward signals in the forward feeder link spectrum. More particularly, up to 6.25 MHz of forward service link frequency spectrum can be used with a Δf of 6.25 MHz before additional feeder links may be required. Accordingly, an expense and/or complexity of multiple gateways can be avoided when such a communications system is initially deployed.

The frequency translations of FIGS. 7*a-b* and 8*a-d* are provided by way of example to illustrate particular embodiments providing one and three forward feeder links. It will be further understood that principles illustrated in FIGS. 7*a-b* and 8*a-d* can be used to adaptively transmit antenna element signals over any number of forward feeder links from any number of geographically separated gateways.

The block diagrams of FIGS. 3, 6, 9, and 10 are provided by way of example to illustrate systems and operations of frequency translations and/or allocations according to embodiments of the present invention. As will be appreciated by one of skill in the art, embodiments of the present invention may take the form of entirely hardware embodiments, entirely software embodiments, and/or embodiments combining software and hardware aspects. It will be further understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks. Some or all of the functionalities illustrated in FIGS. 3, 6, 9, and 10 may thus be implemented using one or more digital signal processors at the space-based component 101, at a ground facility and/or at the beam former 115.

In FIG. 3, for example, functionalities of the sets of frequency translators FT1(1)-FT1(N), FT2(1)-FT2(N), FT3(1)-FT3(N), FT4(1)-FT4(N) and/or FT5(1)-FT5(N) and/or the summers S1-S5 may be provided using one or more digital signal processors at the space-based component 101 so that dedicated frequency translators and/or summers may not be required. Similarly, in FIG. 6, functionalities of the band-pass filters FBP1(1)-FBP1(M), FBP2(1)-FBP2(M), FBP3(1)-FBP3(M), FBP4(1)-FBP4(M) and/or FBP5(1)-FBP5(M) and/or the frequency translators FFT1(1)-FFT1(M), FFT2(1)-FFT2(M), FFT3(1)-FFT3(M), FFT4(1)-FFT4(M) and/or FFT5(1)-FFT5(M) may be implemented using one or more digital signal processors at the space-based component 101 so that dedicated band-pass filters and/or frequency translators may not be required. Moreover, functionalities of signal separators SS1-SS5 of FIG. 9 and/or signal combiners SC1-SC5 of FIG. 10 may be provided using one or more digital signal processors at a ground facility and/or at the beam former 115.

In the drawings and/or the specification, there have been disclosed embodiments of the invention and, although specific terms are employed, they are used in a generic and descriptive sense only and not for purposes of limitation, the scope of the invention being set forth in the following claims.

What is claimed is:

1. A method of operating a communications system including a satellite, the method comprising:
    providing communications service links between the satellite and radioterminals using a plurality of satellite service link antenna feed elements;
    during usage of a first portion of service link spectrum, coupling signals of first and second feed elements, of the plurality of service link antenna feed elements, to a first satellite gateway only; and
    during usage of a second portion of service link spectrum that is larger than the first portion of service link spectrum, coupling signals of the first feed element to the first satellite gateway and to a second satellite gateway and coupling signals of the second feed element to the first satellite gateway and to the second satellite gateway.

2. A method according to claim 1 wherein at least some feed elements of the plurality of satellite service link antenna feed elements are configured to receive information from radioterminals over at least two different polarization orientations.

3. A method according to claim 2 wherein signals of the first and second feed elements are received at the satellite over a feeder link frequency band and transmitted from the first and second feed elements to radioterminals over a service link frequency band.

4. A method according to claim 3 wherein signals of the first and second feed elements are received from radioterminals at the first and second feed elements over a service link frequency band and over at least two different polarization orientations and transmitted to at least one satellite gateway over a feeder link frequency band.

5. A method according to claim 1, the method further comprising:
during usage of a third portion of service link spectrum that is larger than the second portion of service link spectrum, coupling signals of the first feed element to the first, second and a third satellite gateway and coupling signals of the second feed element to the first, second and third satellite gateway.

6. A method according to claim 1 wherein providing communications service links comprises:
providing a first service link between the satellite and a first radioterminal located in a first coverage area; and
providing a second service link between the satellite and a second radioterminal located in a second coverage area.

7. A method according to claim 6 wherein the first and second service links reuse at least one frequency.

8. A method according to claim 1 wherein the signals of the first and second feed elements include at least two differently polarized components of communications with at least one radioterminal in communications with the satellite.

9. A method of operating a communications system including a satellite having a plurality of satellite service link antenna feed elements, the method comprising:
during usage of a first portion of service link spectrum, providing a first feeder link between a first gateway and the satellite and communicating signals for first and second feed elements of the plurality of satellite service link antenna feed elements over the first feeder link only; and
during usage of a second portion of service link spectrum that is larger than the first portion of service link spectrum, providing the first feeder link between the first gateway and the satellite, providing a second feeder link between a second gateway and the satellite, communicating signals for the first feed element over the first and second feeder links, and communicating signals for the second feed element over the first and second feeder links.

10. A method according to claim 9 wherein at least some feed elements of the plurality of satellite service link antenna feed elements are configured to receive information from radioterminals over at least two different polarization orientations.

11. A method according to claim 10 wherein the signals for the first and second feed elements are received at the satellite over a feeder link frequency band and over at least two different polarizations.

12. A method according to claim 11 further comprising:
receiving communications for transmission from the satellite to a radioterminal; and
applying first and second weights to the communications to generate respective signal components for the first and second feed elements.

13. A method according to claim 9 wherein signals for the first and second feed elements are transmitted to the satellite over a feeder link frequency band.

14. A method according to claim 13 further comprising:
combining components of the signals for the first and second feed elements to establish communications with at least one radioterminal.

15. A method according to claim 9, the method further comprising:
during usage of a third portion of service link spectrum that is larger than the second portion of service link spectrum, providing the first feeder link between the first gateway and the satellite, providing the second feeder link between the second gateway and the satellite, providing a third feeder link between a third gateway and the satellite, communicating signals for the first feed element between the first gateway and the satellite, between the second gateway and the satellite and between the third gateway and the satellite over the first, second and third feeder links, respectively, and communicating signals for the second feed element between the first gateway and the satellite, between the second gateway and the satellite and between the third gateway and the satellite over the first, second and third feeder links, respectively.

16. A method according to claim 9 wherein the signals for the first and second feed elements include components of communications with at least one radioterminal in communications with the satellite.

17. A method of operating a communications system including a satellite having a plurality of satellite service link antenna feed elements, the method comprising:
during usage of a first portion of service link spectrum, providing a feeder link between a gateway and the satellite and communicating signals for first and second feed elements of the plurality of satellite service link antenna feed elements between the gateway and the satellite over the feeder link, wherein the signals for the first and second feed elements are separated by a first frequency offset in a feeder link frequency band that is used by the feeder link; and
during usage of a second portion of service link spectrum that is larger than the first portion of service link spectrum, providing the feeder link between the gateway and the satellite and communicating signals for first and second feed elements of the plurality of satellite service link antenna feed elements between the gateway and the satellite over the feeder link, wherein the signals for the first and second feed elements are separated by a second frequency offset in the feeder link frequency band, wherein the first and second frequency offsets are different.

18. A method according to claim 17 wherein at least some feed elements of the plurality of satellite service link antenna feed elements are configured to receive information from radioterminals over at least two different polarization orientations.

19. A method according to claim 18 wherein signals for the first and second feed elements are transmitted over the feeder link frequency band over at least two different polarization orientations.

20. A method according to claim 19 further comprising:
receiving communications for transmission from the satellite to a radioterminal; and
applying first and second weights to the communications to generate respective signal components for the first and second feed elements.

21. A method according to claim 17 wherein signals for the first and second feed elements are received at the satellite over the feeder link frequency band and over at least two different polarization orientations.

22. A method according to claim 21 further comprising:
combining components of the signals for the first and second feed elements to establish communications with at least one radioterminal.

23. A method according to claim 17 further comprising:
during usage of the first portion of service link spectrum, coupling signals associated with the first and second feed elements to a first satellite gateway only; and during usage of the second portion of service link spectrum that is larger than the first portion of service link spectrum, coupling signals associated with the first feed element to the first satellite gateway and to a second satellite gateway and coupling signals associated with the second feed element to the first satellite gateway and to the second satellite gateway.

24. A method according to claim 17 wherein the signals for the first and second feed elements include components of communications for first and second radioterminals.

25. A method according to claim 17, further comprising:
during usage of a third portion of service link spectrum that is larger than the second portion of service link spectrum, providing the feeder link between the gateway and the satellite and communicating signals for first and second feed elements of the plurality of satellite service link antenna feed elements between the gateway and the satellite over the feeder link, wherein the signals for the first and second feed elements are separated by a third frequency offset in the feeder link frequency band, wherein the first and third frequency offsets are different and wherein the second and third frequency offsets are different.

26. A satellite for a communications system, the satellite comprising:
at least one antenna including a plurality of satellite service link antenna feed elements, the at least one antenna providing communications service links between the satellite and radioterminals using the plurality of satellite service link antenna feed elements; and
a translator configured to couple signals of first and second feed elements of the plurality of service link antenna feed elements to a first satellite gateway only during usage of a first portion of service link spectrum, and to couple signals of the first feed element to the first satellite gateway and to a second satellite gateway and to couple signals of the second feed element to the first satellite gateway and to the second satellite gateway during usage of a second portion of service link spectrum that is larger than the first portion of service link spectrum.

27. A satellite according to claim 26 wherein at least some feed elements of the plurality of satellite service link antenna feed elements are configured to receive information from radioterminals over at least two different polarization orientations.

28. A satellite according to claim 27 wherein signals of the first and second feed elements are received at the satellite over a feeder link frequency band and transmitted from the first and second feed elements to radioterminals over a service link frequency band.

29. A satellite according to claim 28 wherein signals of the first and second feed elements are received at the first and second feed elements over a service link frequency band and over at least two different polarization orientations and transmitted from the satellite to at least one satellite gateway over a feeder link frequency band.

30. A satellite according to claim 26 wherein the translator is further configured to couple signals of the first feed element to the first satellite gateway, to the second satellite gateway and to a third satellite gateway and to couple signals of the second feed element to the first satellite gateway, to the second satellite gateway and to the a third satellite gateway during usage of a third portion of service link spectrum that is larger than the second portion of service link spectrum.

31. A satellite according to claim 26 wherein the at least one antenna is configured to provide a first service link between the satellite and a first radioterminal located in a first coverage area, and to provide a second service link between the satellite and a second radioterminal located in a second coverage area.

32. A satellite according to claim 31 wherein the first and second service links reuse at least one frequency.

33. A satellite according to claim 26 wherein the signals of first and second feed elements include at least two differently polarized components of communications with at least one radioterminal in communications with the satellite.

34. A space-based communications system comprising:
a first gateway configured to provide a first feeder link to a satellite; the satellite including a plurality of satellite service link antenna feed elements, wherein the first gateway is configured to communicate signals for first and second feed elements of the plurality of satellite service link antenna feed elements over the first feeder link during usage of a first portion of service link spectrum and to communicate signals for the first and second feed elements over the first feeder link during usage of a second portion of service link spectrum that is larger than the first portion of service link spectrum; and
a second gateway configured to provide a second feeder link to the satellite, and to communicate signals for the first and second feed elements over the second feeder link during usage of the second portion of service link spectrum; wherein the second gateway does not provide any feeder link to the satellite during usage of the first portion of service link spectrum and does not communicate any signals for the first and/or second feed elements during usage of the first portion of service link spectrum.

35. A communications system according to claim 34 wherein at least some feed elements of the plurality of satellite service link antenna feed elements are configured to receive information from radioterminals over at least two different polarization orientations.

36. A communications system according to claim 35 wherein the signals of the first and second feed elements are received at a gateway from the satellite over a feeder link frequency band and over at least two different polarization orientations.

37. A communications system according to claim 36 further comprising:
a beamformer coupled to the first and/or second gateways wherein the beamformer is configured to receive communications for transmission from the satellite to a radioterminal, and to apply first and second weights to the communications to generate respective signal components for the first and second feed elements.

38. A communications system according to claim 34 wherein signals for the first and second feed elements are transmitted to the satellite over a feeder link frequency band.

39. A communications system according to claim 38 further comprising:
a beamformer configured to combine signal components of the first and second feed elements to establish communications with a radioterminal.

40. A communications system according to claim 34 wherein during usage of a third portion of service link spectrum that is larger than the second portion of service link spectrum the first gateway is configured to provide the first feeder link to the satellite and to communicate signals for the first and second feed elements over the first feeder link and the second gateway is configured to provide the second feeder link to the satellite and to communicate signals for the first and second feed elements over the second feeder link, the communications system further comprising:

a third gateway configured to provide a third feeder link to the satellite, and to communicate signals for the first and second feed elements over the third feeder link.

41. A space-based communications system comprising:

a gateway configured to provide a feeder link to a satellite and to communicate signals for first and second feed elements of a plurality of satellite service link antenna feed elements of the satellite over the feeder link during usage of a first portion of service link spectrum; and to communicate signals for the first and second feed elements over the feeder link during usage of a second portion of service link spectrum that is larger than the first portion of service link spectrum;

wherein the signals for the first and second feed elements during usage of the first portion of service link spectrum are separated by a first frequency offset in a feeder link frequency band and wherein the signals for the first and second feed elements during usage of the second portion of service link spectrum are separated by a second frequency offset, in the feeder link frequency band, that is different than the first frequency offset.

42. A communications system according to claim 41 wherein at least some feed elements of the plurality of satellite service link antenna feed elements are configured to receive information from radioterminals over at least two different polarization orientations.

43. A communications system according to claim 42 wherein signals of the first and second feed elements are transmitted over the feeder link frequency band over at least two different polarization orientations.

* * * * *

UNITED STATES PATENT AND TRADEMARK OFFICE
CERTIFICATE OF CORRECTION

PATENT NO.       : 7,609,666 B2                                               Page 1 of 1
APPLICATION NO.  : 11/375422
DATED            : October 27, 2009
INVENTOR(S)      : Karabinis It is certified that error appears in the above-identified patent and that said Letters Patent is hereby corrected as shown below:

Column 51, Claim 30, Line 63: Please correct "and to the a third"
to read -- and to the third --.

Signed and Sealed this

Sixteenth Day of March, 2010

David J. Kappos
*Director of the United States Patent and Trademark Office*